United States Patent
Poletto et al.

(10) Patent No.: US 9,462,054 B2
(45) Date of Patent: Oct. 4, 2016

(54) SYSTEMS AND METHODS FOR PROVIDING A USER WITH A SET OF INTERACTIVITY FEATURES LOCALLY ON A USER DEVICE

(71) Applicant: Dropbox, Inc., San Francisco, CA (US)

(72) Inventors: Stephen Poletto, San Francisco, CA (US); Peter Belknap, San Mateo, CA (US); Thomas Kleinpeter, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 14/247,776

(22) Filed: Apr. 8, 2014

(65) Prior Publication Data

US 2015/0244794 A1 Aug. 27, 2015

Related U.S. Application Data

(60) Provisional application No. 61/945,805, filed on Feb. 27, 2014.

(51) Int. Cl.
  *H04L 29/08* (2006.01)
  *G06F 17/30* (2006.01)

(52) U.S. Cl.
  CPC ..... *H04L 67/1085* (2013.01); *G06F 17/30073* (2013.01); *G06F 17/30575* (2013.01); *H04L 29/08* (2013.01); *H04L 67/1095* (2013.01)

(58) Field of Classification Search
  None
  See application file for complete search history.

(56) References Cited

U.S. PATENT DOCUMENTS

| | | | |
|---|---|---|---|
| 5,928,330 A | 7/1999 | Goetz et al. | |
| 6,281,874 B1 * | 8/2001 | Sivan | G06F 17/3028 345/2.1 |
| 6,389,592 B1 * | 5/2002 | Ayres et al. | 717/172 |

(Continued)

FOREIGN PATENT DOCUMENTS

| | | |
|---|---|---|
| EP | 2613274 | 7/2013 |
| EP | 2690843 | 1/2014 |

(Continued)

OTHER PUBLICATIONS

Eliza Kern, "Albumatic and Cluster try a fresh take on an old problem: group photo-sharing"; Feb. 27, 2013 Gigaorn: URL: http://gigaom.com/2013/02/27/albumatic-and-cluster-try-a-fresh-take-on-an-old-problem-group-photo-sharing/.

(Continued)

*Primary Examiner* — Tuan S Nguyen
(74) *Attorney, Agent, or Firm* — Keller Jolley Preece

(57) ABSTRACT

Providing a user with an interactive user interface that may fully enable interactions regardless of connectivity status may be provided. In some embodiments, one or more content items may be selected by a user of the user devices and may be queued for upload to a content management system. The content items may be organized into one or more collections of content items with other content items already stored in a user account on the content management system, such as images having similar geo-temporal characteristics. A set of interactivity features may be available to the user for interacting with the queued content item. This may provide the user with the seamless feeling as if the content items have been uploaded to the content management system and the user may be interacting with the content items on the content management system, even if the upload has not been completed.

27 Claims, 15 Drawing Sheets

(56) References Cited

U.S. PATENT DOCUMENTS

| | | | |
|---|---|---|---|
| 6,629,100 | B2 | 9/2003 | Morris et al. |
| 7,240,053 | B2 | 7/2007 | Svendsen et al. |
| 7,542,994 | B2 | 6/2009 | Anderson |
| 7,653,302 | B2 | 1/2010 | Limberis et al. |
| 7,899,887 | B2 | 3/2011 | Conn et al. |
| 7,933,972 | B1 | 4/2011 | Issa et al. |
| 8,001,471 | B2 * | 8/2011 | Shaver et al. ............... 715/716 |
| 8,195,646 | B2 * | 6/2012 | Evans et al. ................. 707/716 |
| 8,407,216 | B2 | 3/2013 | Walker et al. |
| 8,418,068 | B1 * | 4/2013 | Backus ............. H04N 1/00167 345/619 |
| 8,527,340 | B2 | 9/2013 | Fisher et al. |
| 8,527,602 | B1 * | 9/2013 | Rasmussen et al. .......... 709/207 |
| 8,554,020 | B2 | 10/2013 | Berger et al. |
| 8,645,860 | B2 * | 2/2014 | Brenneman ........... G06F 17/211 715/800 |
| 9,112,936 | B1 | 8/2015 | Poletto et al. |
| 2005/0210413 | A1 | 9/2005 | Quek et al. |
| 2006/0080286 | A1 | 4/2006 | Svendsen |
| 2006/0139709 | A1 | 6/2006 | Bifano et al. |
| 2006/0221190 | A1 * | 10/2006 | Limberis et al. .......... 348/207.1 |
| 2007/0035764 | A1 * | 2/2007 | Aldrich ............. G06F 17/3028 358/1.15 |
| 2008/0133701 | A1 * | 6/2008 | Kazmi et al. ................ 709/217 |
| 2009/0157680 | A1 | 6/2009 | Crossley et al. |
| 2009/0204885 | A1 | 8/2009 | Ellsworth et al. |
| 2009/0248711 | A1 | 10/2009 | Martinez et al. |
| 2010/0076976 | A1 | 3/2010 | Sotirov et al. |
| 2011/0069179 | A1 | 3/2011 | Bathiche et al. |
| 2011/0109769 | A1 | 5/2011 | Bhatt et al. |
| 2011/0269437 | A1 | 11/2011 | Marusi et al. |
| 2011/0270929 | A1 | 11/2011 | Harrang et al. |
| 2011/0276423 | A1 * | 11/2011 | Davidson ............... G06Q 30/06 705/26.1 |
| 2011/0288946 | A1 * | 11/2011 | Baiya et al. ................ 705/26.1 |
| 2011/0295929 | A1 | 12/2011 | Sagar et al. |
| 2012/0079013 | A1 | 3/2012 | Shepstone |
| 2012/0158846 | A1 * | 6/2012 | Linder .......................... 709/204 |
| 2012/0203796 | A1 | 8/2012 | Abraham et al. |
| 2012/0251082 | A1 | 10/2012 | De Vos et al. |
| 2012/0278387 | A1 | 11/2012 | Garcia et al. |
| 2012/0323868 | A1 * | 12/2012 | Robbin ............. G06F 17/30899 707/695 |
| 2012/0331091 | A1 * | 12/2012 | Tseng ........................... 709/217 |
| 2013/0013687 | A1 | 1/2013 | Liu |
| 2013/0041948 | A1 | 2/2013 | Tseng |
| 2013/0086109 | A1 | 4/2013 | Huang |
| 2013/0103757 | A1 | 4/2013 | Mitchell et al. |
| 2013/0145430 | A1 | 6/2013 | Wong et al. |
| 2013/0268585 | A1 | 10/2013 | Shepstone |
| 2013/0332512 | A1 | 12/2013 | Roman et al. |
| 2014/0050419 | A1 | 2/2014 | Lerios et al. |
| 2014/0111516 | A1 * | 4/2014 | Hall ...................... G06F 17/212 345/428 |
| 2015/0358224 | A1 | 12/2015 | Poletto et al. |

FOREIGN PATENT DOCUMENTS

| | | |
|---|---|---|
| WO | WO 2009/153587 | 12/2009 |
| WO | 2012177242 A1 | 12/2012 |
| WO | WO 2013/032919 | 3/2013 |
| WO | WO 2013/055371 | 4/2013 |
| WO | WO 2013/127449 | 9/2013 |

OTHER PUBLICATIONS

Sarah Perez, "Cluster Brings Simple Group Photo-Sharing To Android"; Oct. 14, 2013 Techcrunch.com; URL: http://techcrunch.com/2013/10/14/cluster-brings-simple-social-photo-sharing-to-android/.

Tye Rattenbury, Nathaniel Good and Mor Naarnan, "Towards Automatic Extraction of Event and Place Semantics from Flickr Tags"; SIGIR'07 (Special Interest Group On Information Retrieval) Jul. 23-27, 2007.

Matthew Cooper, Jonathan Foote, Andreas Girgensohn, and Lynn Wilcox, "Temporal Event Clustering for Digital Photo Collections"; MM'03 (2003 11th Annual ACM International Conference on Multimedia) Nov. 2-8, 2003.

International Search Report issued in PCT/US14/72006 on Mar. 6, 2015.

International Search Report issued in PCT/US14/72004 on Mar. 10, 2015.

U.S. Appl. No. 14/247,840, mailed Oct. 7, 2014, Office Action.

U.S. Appl. No. 14/247,840, mailed Jun. 17, 2015, Notice of Allowance.

* cited by examiner

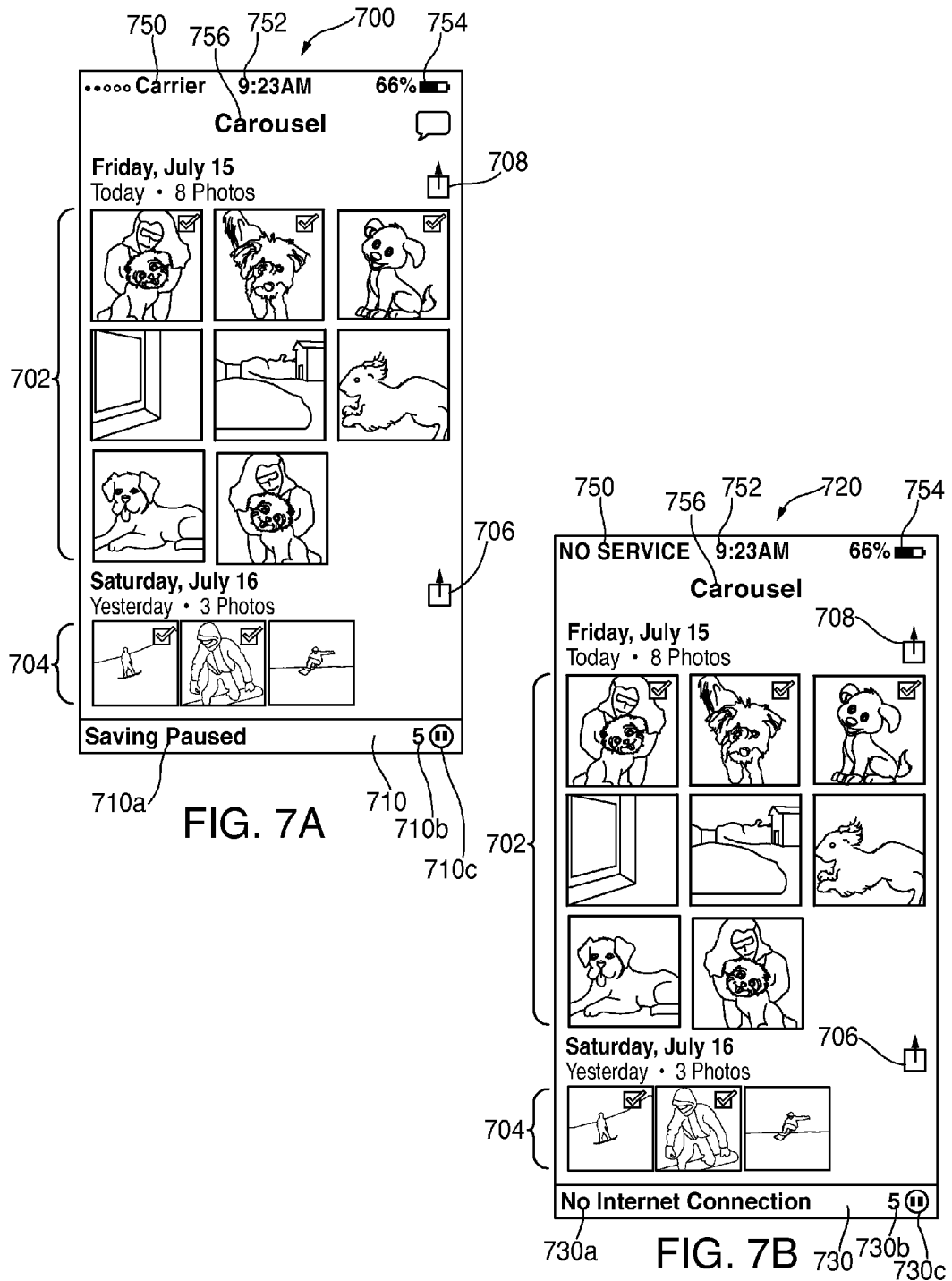

SYSTEMS AND METHODS FOR PROVIDING A USER WITH A SET OF INTERACTIVITY FEATURES LOCALLY ON A USER DEVICE

CROSS-REFERENCE TO RELATED PROVISIONAL APPLICATION

This application claims the benefit of U.S. Provisional Patent Application No. 61/945,805, filed on Feb. 27, 2014, entitled "SYSTEMS AND METHODS FOR PROVIDING A USER WITH A SET OF INTERACTIVITY FEATURES LOCALLY ON A USER DEVICE," the disclosure of which is incorporated herein by reference in its entirety.

FIELD OF THE INVENTION

Various embodiments generally relate to providing a user with a set of interactivity features locally on a user device.

BACKGROUND

While photograph applications, video applications, and other content sharing applications have become increasingly popular on user devices, the services and features currently provided by these applications come with inherent limitations. For example, many content sharing applications require full connectivity between the content sharing application's server and a user device accessing the server through a local application. If the level of connectivity between the server and the device is low, for example, the ability to present/provide the user with content is hindered. Additionally, if a user of the user device tries to share content with a server, their sharing capabilities may be affected by the level of connectivity.

Interactivity limitations between the user device and the server often arise when less than ideal connectivity conditions are present. For example, if there is a low level of connectivity between the device and the server, the user may not be able to send content to the server or share content with one or more contacts. This can be frustrating and troublesome for the user because they may desire to interact with their content without any constraints despite any limitations that may be outside of their control (e.g., low connectivity/signal).

Thus, it would be beneficial for there to be systems and methods that provide a user with a set of interactivity features locally on their user device.

SUMMARY

Systems, methods, and non-transitory computer readable media for providing a user with an interactive user interface that may enable interactions regardless of connectivity status may be provided. Such systems may include one or more processors, a display screen, communications circuitry, and memory containing instructions.

Such methods may include queuing an image to be uploaded from a user device to a content management system. In some embodiments, one or more images may be selected by a user of the user device, and these selected images may be queued for upload to the content management system. The image may be presented locally within a user interface displayed on the user device prior to the upload. In some embodiments, the image may be organized in one or more collections with one or more images already stored in the user's account on the content management system. For example, images stored in the user's account that may correspond to a similar geo-temporal event as the queued image may be grouped together. A full set of interactivity features may be available to the user to interact with the queued image and/or the queued image and the one or more images already stored in the user's account. This may provide the user with the seamless feeling as if the images have been uploaded to the content management system and the user may be interacting with the images, even if the upload has not fully been completed.

In some embodiments, metadata associated with the queued image may be uploaded to the content management system prior to uploading the image. Grouping data for the image may be received by the user device based on the uploaded metadata. For example, metadata corresponding to an image's location and time of capture may be uploaded prior to the image being uploaded to the content management system. Thus, the image to be grouped with one or more additional images that are already stored on the content management system and correspond to a similar location and time.

In some embodiments, presenting the image locally to the user may include categorizing the image with all images currently present in the user's account on the content management system, and which are also known to the user device. For example, the images may have already downloaded from the user's account on the content management system and stored in memory on the user device, or the images may be cached on the user device. Presenting the image locally may also include categorizing the image within additionally selected, but not yet uploaded (fully or partially) images, and presenting the image within an appropriate collection. For example, the user may select multiple images from an event, and as the images are being uploaded, each may be grouped with the other selected images even if not all have been uploaded to the content management system yet.

In some embodiments, a level of connectivity between the user device and the content management system may be determined. If the level of connectivity exceeds a defined threshold, an upload of the image may be performed. However, if the level of connectivity does not exceed the defined threshold, the upload of the image may be paused. In some embodiments, the upload may resume in response to a determination that the level of connectivity now exceeds the defined threshold. For example, the defined threshold may correspond to a strong Wi-Fi connection. A user may access a Wi-Fi network having between zero (0) and four (4) bars of connection, for example, where zero (0) bars may correspond to no Wi-Fi signal, and four (4) bars may correspond to a maximum amount of available signal. In this scenario, the defined threshold may correspond to three (3) or more bars of connection. Furthermore, in this scenario, full Wi-Fi connection may correspond to four (4) bars of connection. If the level of connectivity is less than the full Wi-Fi connection, then the uploading of the image may remain paused until the full Wi-Fi connection returns or is reestablished.

Such methods may also include accessing an account on a content management system over a communications network using a user device's communications circuitry. In some embodiments, the account may correspond to a user of the user device. A first version of an image may be downloaded from the content management system and displayed within a user interface on the device. The user device may also store data corresponding to any interactions between the user and the user interface in storage, and may attempt to send the stored data to the content management system. The user may be provided with a set of interactivity features, such as obtaining results of the interactions prior to the transmission beginning or completing. The set of interactivity features may include, but are not limited to such features as sharing, modifying, copying to a folder or collection, adding to a shared virtual space, and/or providing a message. For example, the results of the interactions may be presented on the user interface regardless of whether or not the transmission has completed. In some embodiments, the attempt to send the stored data and the presentation of the results of the interactions may occur at a substantially same time.

In some embodiments, a background download of a second version of the image may be performed while the first version of the image is displayed within the user interface. For example, the first version may be a low resolution version of the image and the second version may be a high resolution version of the image. While the user interacts with the low resolution version of the image, the high resolution version may download in the background. Thus, a user may be able to locally interact with a first version of an image while obtaining a second version. This may allow the user to interact with a version of the image as soon as possible, while still receiving a highest quality image despite any latency associated with downloading the higher quality image.

BRIEF DESCRIPTION OF THE DRAWINGS

The above and other aspects and advantages of the invention will become more apparent upon consideration of the following detailed description, taken in conjunction with accompanying drawings, in which like referenced characters refer to like parts throughout, and in which:

FIGS. 7A-E show various schematic illustrations of user interfaces displaying paused uploading of images to a content management system based on factors in accordance with various embodiments;

DETAILED DESCRIPTION OF THE DISCLOSURE

Methods, systems, and computer readable media for supporting a set of interactivity features locally on a user device are provided. By enabling a user to feel as though their device is fully interactive even when connectivity is limited, the user experience and functionality provided to the user may be greatly enhanced.

It is noted that the terms "device" and "content management system" are used herein to refer broadly to a wide variety of storage providers and data management service providers, electronic devices and user devices. It is also noted that the term "content item" is user herein to refer broadly to a wide variety of digital data, documents, text content items, audio content items, video content items, portions of content items, and/or other types of data. Content items may also include files, folders or other mechanisms of grouping content items together with different behaviors, such as collections of content items, playlists, albums, etc. The term "user" is also used herein broadly, and may correspond to a single user, multiple users, authorized accounts, an application or program operating automatically on behalf of, or at the behest of a person, or any other user type, or any combination thereof. The term "gesture" and "gestures" are also used herein broadly, and may correspond to one or more motions, movements, hoverings, inferences, signs, or any other such physical interactions with one or more sensors, or any combination thereof, including vocal commands or interpretations of eye movements based on retinal tracking. The term "continuous real-time image" is also used herein broadly, and may correspond to live images captured via one or more image capturing components, continuous images captured, recorded images, or any other type of image that may be captured via an image capturing component, or any combination thereof.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

Figure 1:
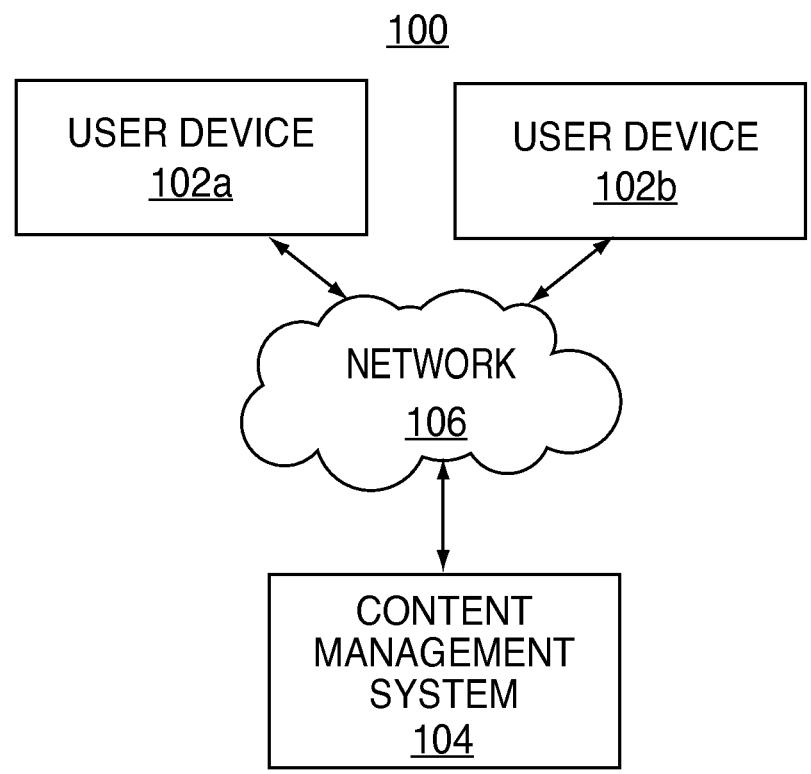
FIG. 1 shows an exemplary system in accordance with various embodiments.

FIG. 1 shows an exemplary system in accordance with various embodiments. System 100 may include user devices 102a and 102b, which may communicate with content management system 104 across network 106. Persons of ordinary skill in the art will recognize that although only two user devices are shown within system 100, any number of user devices may interact with content management system 104 and/or network 106, and the aforementioned illustration is merely exemplary.

Network 106 may support any number of protocols, including, but not limited to, Transfer Control Protocol and Internet Protocol ("TCP/IP"), Hypertext Transfer Protocol ("HTTP"), and/or wireless application protocol ("WAP"). For example, user device 102a and user device 102b (collectively 102) may communicate with content management system 104 using TCP/IP, and, at a higher level, use a web browser to communicate with a web server at content management system 104 using HTTP.

A variety of user devices 102 may communicate with content management system 104, including, but not limited to, desktop computers, mobile computers, mobile communication devices (e.g., mobile phones, smart phones, tablets), televisions, set-top boxes, and/or any other network enabled device. Various types of user devices may include, but are not limited to, smart phones, mobile phones, tablet computers, personal digital assistants (PDAs), laptop computers, digital music players, and/or any other type of user device capable of including a touch-sensing display interface. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive and detect gestures. Multi-touch panels, for example, may include capacitive sensing mediums having a one or more of row traces and/or driving line traces, and one or more column traces and/or sensing lines. Although multi-touch panels are described herein as one example for touch-sensing display interface, persons of ordinary skill in the art will recognize that any touch-sensing display interface may be used. Furthermore, various types of user devices may, in some embodiments, include one or more image capturing components. For example, user devices 102 may include a front-facing camera and/or a rear facing camera.

Figure 13:
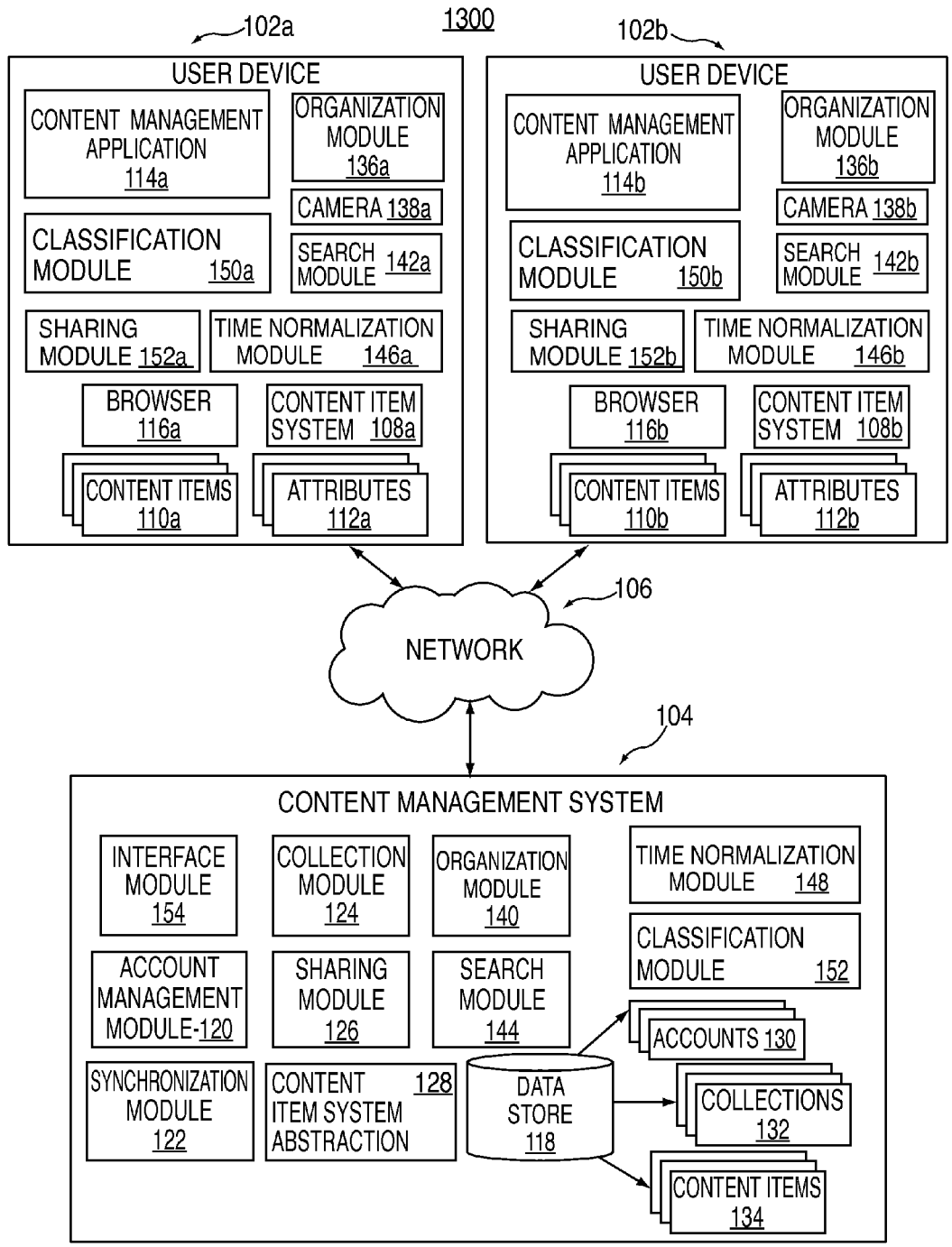
FIG. 13 shows another exemplary system in accordance with various embodiments.

Content management system 100 may allow a user with an authenticated account to store content, as well as perform management tasks, such as retrieve, modify, browse, synchronize, and/or share content with other accounts. In some embodiments, a counter-part user interface (e.g., stand-alone application, client application, etc.) on user devices 102 may be implemented using a content management interface module to allow a user to perform functions offered by modules of content management system 104. A more detailed description of system 100 is presented below, with reference to FIG. 13.

Figure 2:
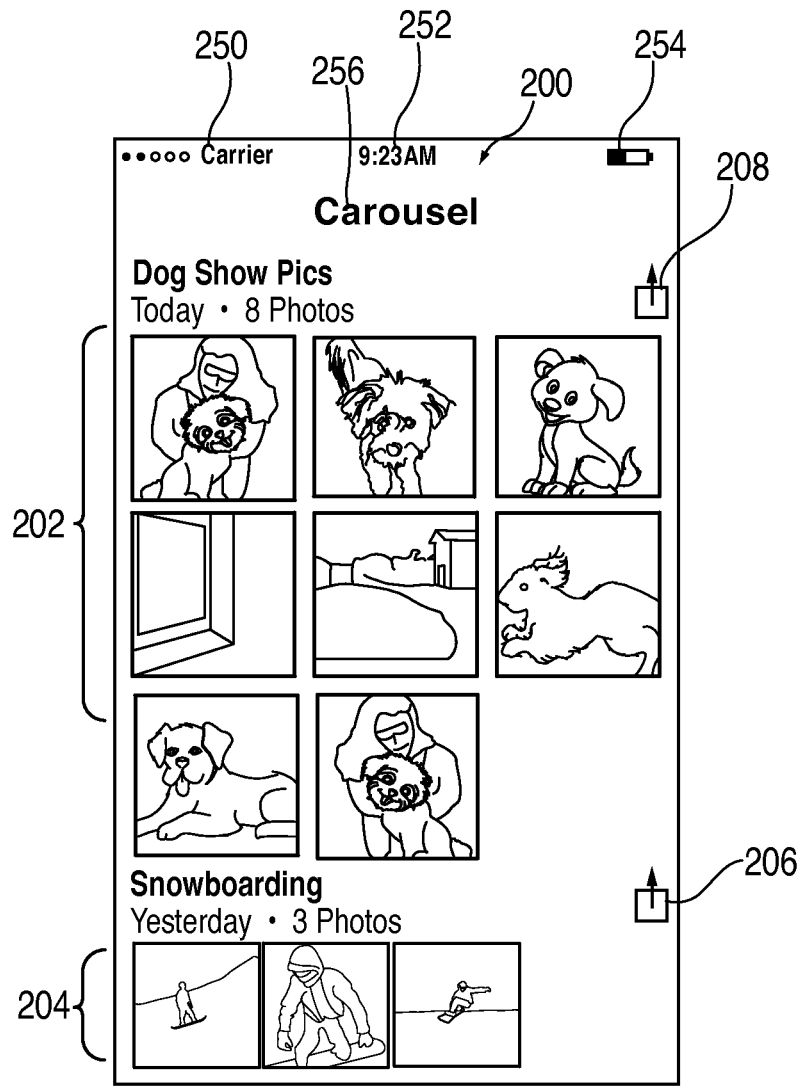
FIG. 2 shows a schematic illustration of a user interface displaying images stored on a user device in accordance with various embodiments.

FIG. 2 shows a schematic illustration of a user interface displaying content items in accordance with various embodiments. In some embodiments, the displayed content items may be stored on the user device (e.g., user device 102) and/or within a user account on a content management system (e.g., content management system 100). User interface 200 may include content item collections 202 and 204, which each may include one or more content items, such as images, photographs, and/or videos. For example, images included within collections 202 and 204 may, in some embodiments, correspond to any type of image and/or video including, but not limited to, higher-quality ("HQ") images, lower-quality ("LQ") images, high resolution images, low resolution images, thumbnail resolution or thumbnail images, high-definition ("HD") images, panoramic images, mosaic images, short videos, short looping videos, movies, video clips, or any other type of image, or any combination thereof. In some embodiments, content items included within collections 202 and 204 may correspond to text items, folders of content items, directories, music items, video items, or any other type of content item, or any combination thereof. In some embodiments, application title 256 may be displayed on user interface 200. For example, application title 256 may indicate to the user the current program and/or mode of the user interface.

In some embodiments, user interface 200 may include service carrier and strength indicator 250, time indicator 252, and/or battery charge indicator 254. Service carrier and strength indicator may display to the user the current cellular service or network connectivity strength, and the source or carrier providing the service. In some embodiments, a Wi-Fi indicator may be present adjacent to indicator 250, however if no Wi-Fi is present, this feature may not be displayed. Time indicator 252 may display the current time and/or date using any suitable means. For example, indicator 252 may display a date and time in terms of day/month/year and time, or via any other suitable means. Indicator 252 may also display "military" time (e.g., 13:00 hrs). Battery charge indicator 254 may display to the user the current battery charge of the device. For example, indicator 254 may display a battery having a graphical and/or numeric representation of an amount of charge remaining on the device (e.g., percentage, time capable for being used, etc.). Persons of ordinary skill in the art will recognize that indicators 250, 252, and/or 254 may be displayed any way within user interface 200, and the use of each one, or the use of each one at an upper portion of the user interface, is merely exemplary.

Collections 202 and/or 204 may be obtained from any suitable source. In some embodiments, a user may obtain content items, such as photographs and/or videos, via one or more image capturing components located on their user device. For example, one or more images and/or videos may be captured using camera 138. In some embodiments, one or more content items may be obtained from a received message or email. For example, a user may receive an MMS message from a contact, where the message includes an image. The user may save the image to their device, and the image may then be displayed within user interface 200. In still further embodiments, the user may obtain one or more content items from a social media network, a website, a photo streaming service, and/or a content management system.

In some embodiments, the user may share one or more of content items within collections 202 and/or 204 by selecting one of share buttons 206 and 208, respectively. For example, if the user decides to share some or all of the images within collection 202, the user may select share button 208. Invocation of share button 208 may enable the user to share any selected images from collection 202. For example, the user may share selected images with one or more of the user's contacts, one or more social media networks, and/or a content management system.

In some embodiments, one or more images from collections 202 and/or 204 may be selected. Selection of an image may involve using any suitable process including, but not limited to, clicking on an image, tapping on an image, swiping an image, providing an audio command, or any other selection means, or any combination thereof. In some embodiments, a "Select All" option may be present allowing the user to select all images included within a collection.

Figure 3:
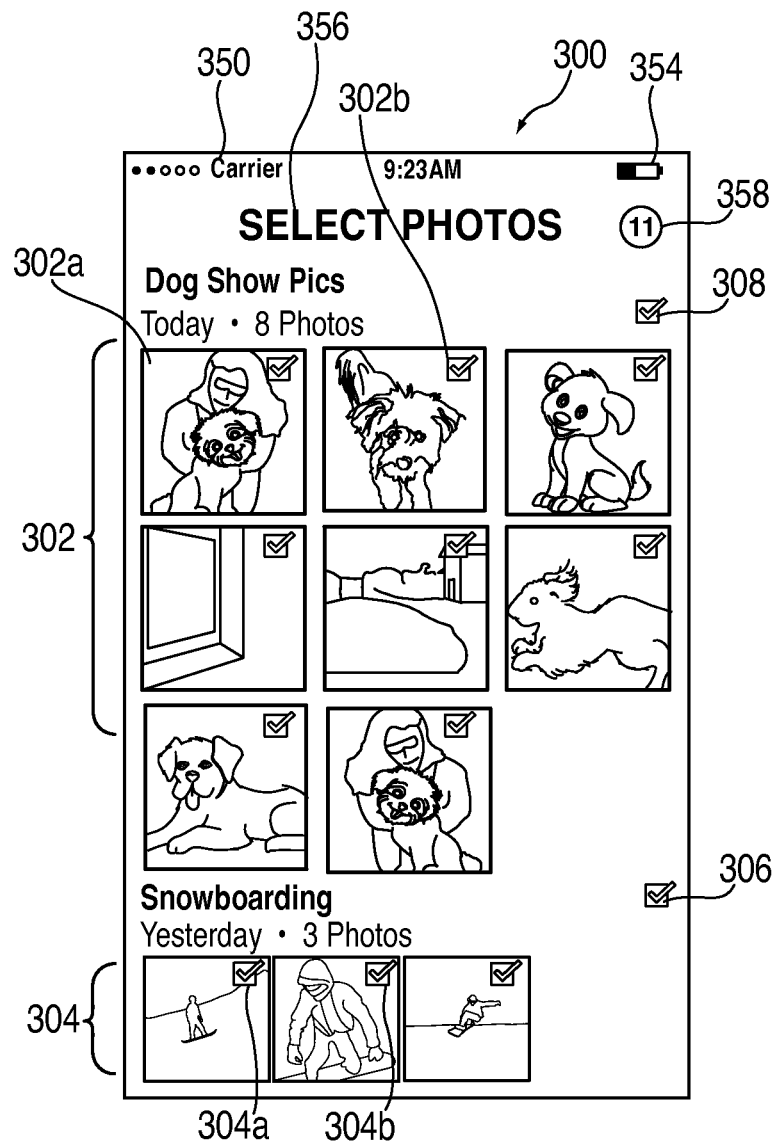
FIG. 3 shows a schematic illustration of a user interface displaying images selected to be uploaded to a content management system from a user device in accordance with various embodiments.

FIG. 3 shows a schematic illustration of a user interface displaying content items selected to be uploaded to a content management system in accordance with various embodiments. User interface 300 may include content items collections 302 and 304, which each may include one or more content items. In some embodiments, collections 302 and 304 may be substantially similar to collections 202 and 204 of FIG. 2, and the previous description of the latter may apply to the former. Furthermore, user interface 300 may include service carrier and strength indicator 350, time indicator 352, battery charge indicator 354, and/or application title 356, which may, in some embodiments, be substantially similar to service carrier and strength indicator 250, time indicator 252, battery charge indicator 254, and/or application title 256 of FIG. 2, and the previous description of the latter may apply to the former.

A user may select one or more content items from collections 302 and 304 using any suitable means, as previously mentioned. In response to the user switching from a collections display mode to a selection mode, one or more features of the user interface may change. For example, user interface 200 may correspond to a collections display mode where items from within a collection may be displayed. The user may press a "select" button and/or a "share" button (e.g., share button 206), and may be presented with user interface 300. User interface 300 may include options allowing the user to select one or more of the content items included within a particular collection. While in the selection mode, user interface 300 may also include a different background and/or color scheme than the collections display mode to help distinguish between the two modes.

In the selection mode, each item from within the collection may include a selection marker if the user selects that particular item or items. For example, selection markers 302a and 302b may appear if the user selects the corresponding images from collection 302. Similarly, selection markers 304a and 304b may appear if the user selects the corresponding images from collection 304. In some embodiments, the user may select all of the content items from a particular collection by selecting an overall selection marker. For example, selection of selection marker 308 may select each image included within collection 302. Similarly, selection of selection marker 306 may select each image included within collection 304. In some embodiments, the user may unselect any image, content item, or collection of content items, by pushing the corresponding selection marker again, thereby disabling selection.

In some embodiments, user interface 300 may include indicator 358 depicting a number of content items that have been selected. For example, if overall selection marker 308 has been pressed, each content item from collection 302 may be selected. In this scenario, indictor 308 may display the number "8" corresponding to the eight selected images included within collection 302. As another example, if both selection markers 306 and 308 have been selected, indicator 358 may display the number "11" corresponding to the eleven images included within both collections 302 and 304. In some embodiments, there may be multiple indicators per collection. For example, collection 302 and collection 304 may each have their own respective indicator. This may allow the user to see how many content items within each collection have been selected. In some embodiments, the individual indicators for each collection may be present along with an overall selection indicator corresponding to the aggregate of the individual collection indicators.

Figure 4:
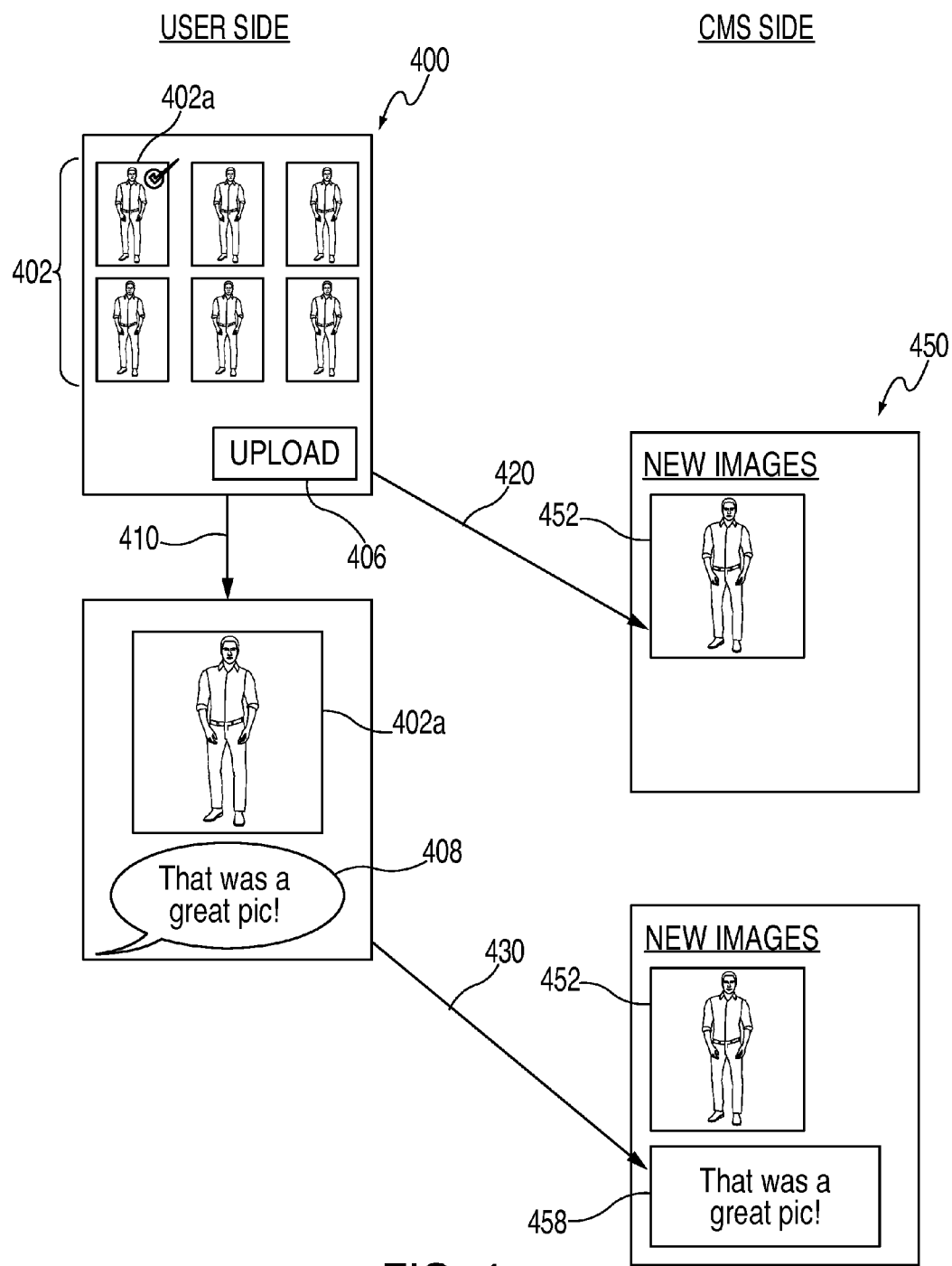
FIG. 4 shows a schematic illustration of a user interface displaying an image upload and content upload and the corresponding results on the content management system side in accordance with various embodiments.

FIG. 4 shows a schematic illustration of a user interface displaying an image/content upload and the corresponding results of the upload on the content management system in accordance with various embodiments. FIG. 4 may include a client side user interface and a content management system side user interface. Both the client side and the content management system side work together to describe the image/content upload process, and therefore may both be described together.

Client side user interface 400 may include one or more collections of content items, such as collection 402. In some embodiments, collection 402 may include one or more images and/or videos. A user may select one or more images to share with one or more contacts, one or more social media networks, and/or a content management system. For example, a user may select image 402a to share via a content management system, such as content management system 100. In some embodiments, the selected content item may include a selection marker to indicate that the content item has been selected. For example, a selection marker for a selected image may be displayed on the image to indicate that the user has chosen that particular image. In some embodiments, after image 402a has been selected, the user may push upload button 406 to upload image 402a.

In some embodiments, the content item selected to be uploaded may be sent to the content management system across a network using communications circuitry resident on the user device. For example, image 402a may attempt to be sent across one or more networks to the content management system via transmission line 420. In some embodiments, the attempted transmission may occur substantially in the background making the process seamless to the user. For example, the user may perform edits to image 402a using their user device while image 402a attempts to be sent to content management system 100.

In some embodiments, a copy of image 402a may be sent to the content management system. The copy of the image may be created at a substantially the same time as the selection of image 402a and/or activation of upload button 406. By sending a copy of the image, the original image may remain stored on the user device for persistence. In some embodiments, the copy of the image may correspond to a pointer to the image on the device, a compressed version of the image, and/or a reduced size version of the image. For example, the copy of the image sent to the content management system may be a lower resolution version of the image than the version stored on the device. Persons of ordinary skill in the art will recognize that any type of content item may be used in the aforementioned scenario, and the use of an image is merely exemplary.

User interface 450 may correspond to a user interface of the content management system. In some embodiments, user interface 450 may be fictitious because no corresponding user may be viewing it. For example, user interface 450 may be referred to as a background interface. Persons of ordinary skill in the art will understand that user interface 450 may include some or all of the features of user interface 400, or any other type of user interface, and whether or not a user views the interface does not preclude it from including any features capable of being present therein. As the transmission of the image completes, image 452 may appear within user interface 450. As previously mentioned, the image uploaded to the content management system may be a copy of the image selected for uploaded on user interface 400. Thus, in some embodiments, image 452a and image 402a may be substantially similar.

Prior to or during the attempted upload of image 402*a* to the content management system, the user may have a set of interactivity features provided to them. The set of interactivity features may be substantially similar to a set of interactivity features provided to the user by the content management system. For example, the user may be capable of sharing, editing, annotating, and/or modifying the image on the content management system, and therefore some or all of these options may be provided to the user on their user device. The provided set of interactivity features may, in some embodiments, be provided at a substantially same time as a content item, such as image 402*a*, is selected or attempts, to be uploaded to the content management system. Thus, to the user, it may appear as if the image has already been uploaded to the content management system and their interactions are synchronized or taking place on the content management system. Thus, the user may have the experience of image 402*a* being uploaded to the content management system regardless of the actual upload status of the image. For example, the user may be able to interact with image 402*a* as if it were already uploaded to the content management system. Therefore, even prior to a selected content item completely uploading to the content management system, the user may be provided with some or all of the features typically provided to them by the content management system with the exception that they may actually be provided by the user device. For example, if connectivity between the user device and the content management system became unavailable or limited, the uploading may not be able to be completed. However the user may still be able to interact with image 402*a* because the user device may allow them to modify, message, annotate, or provide a request or attempt to share the image. For example, the user may attempt to share image 402*a* prior to it uploading to the content management system. The request to share the image may be displayed to the user as if the share request had sent, even though the share request may not have occurred. Upon access being available, the share request may occur without the user having to take any additional actions.

In some embodiments, after the user has pushed or activated upload button 406, the user may be presented with user interface 400 including the selected image 402*a* in a full screen or a substantially full screen view. The user may be provided with a set of interactivity features that allow the user to interact with image 402*a* in the full screen mode. For example, the user may be able to provide a message 408 to image 402*a*. Message 408 may include text, images, videos, hyperlinks, attachments, or any other form of content capable of being associated with image 402*a*. In some embodiments, image 402*a* may be assigned an identification tag by the device in response to being stored and/or shared with the content management system. The identification tag may be a string or identifier created by the device and/or content management system. For example, in response to sharing image 402*a* with content management system 100, the user device may assign an identification tag to image 402*a* signifying that the image has been shared. In some embodiments, in response to creation of message 408, another identification tag may be created and assigned to message 408. The identification tag created for message 408 may include one or more similar characteristics to associate message 408 with image 402*a*. For example, if the identification tag for image 402*a* is a 16-bit string of alphanumeric characters, a first portion may be shared by any message created that may be associated with image 402*a*. In this scenario, message 408 would include the first portion as part of its identification tag.

In some embodiments, in response to creating message 408, the message and any content included within the message may be sent to the content management system and stored with image 452*a* on the CMS. For example, the message may be uploaded with its associated image. In some embodiments, a copy of the message may be sent to the content management system. The message and/or its duplicate may be sent in response to the user invoking a corresponding upload button. In some embodiments, the transmission of a copy of the message may be substantially similar to the transmission of a copy of the image, as previously mentioned. Message 408 may attempt to be sent to the content management system across transmission line 430. In some embodiments, transmission line may be substantially similar to transmission line 420 with the exception that it may have a different level of connectivity dependent on whether or not any change in connection has occurred between the time of attempted transmission fir image 402*a* and message 408.

Figure 5:
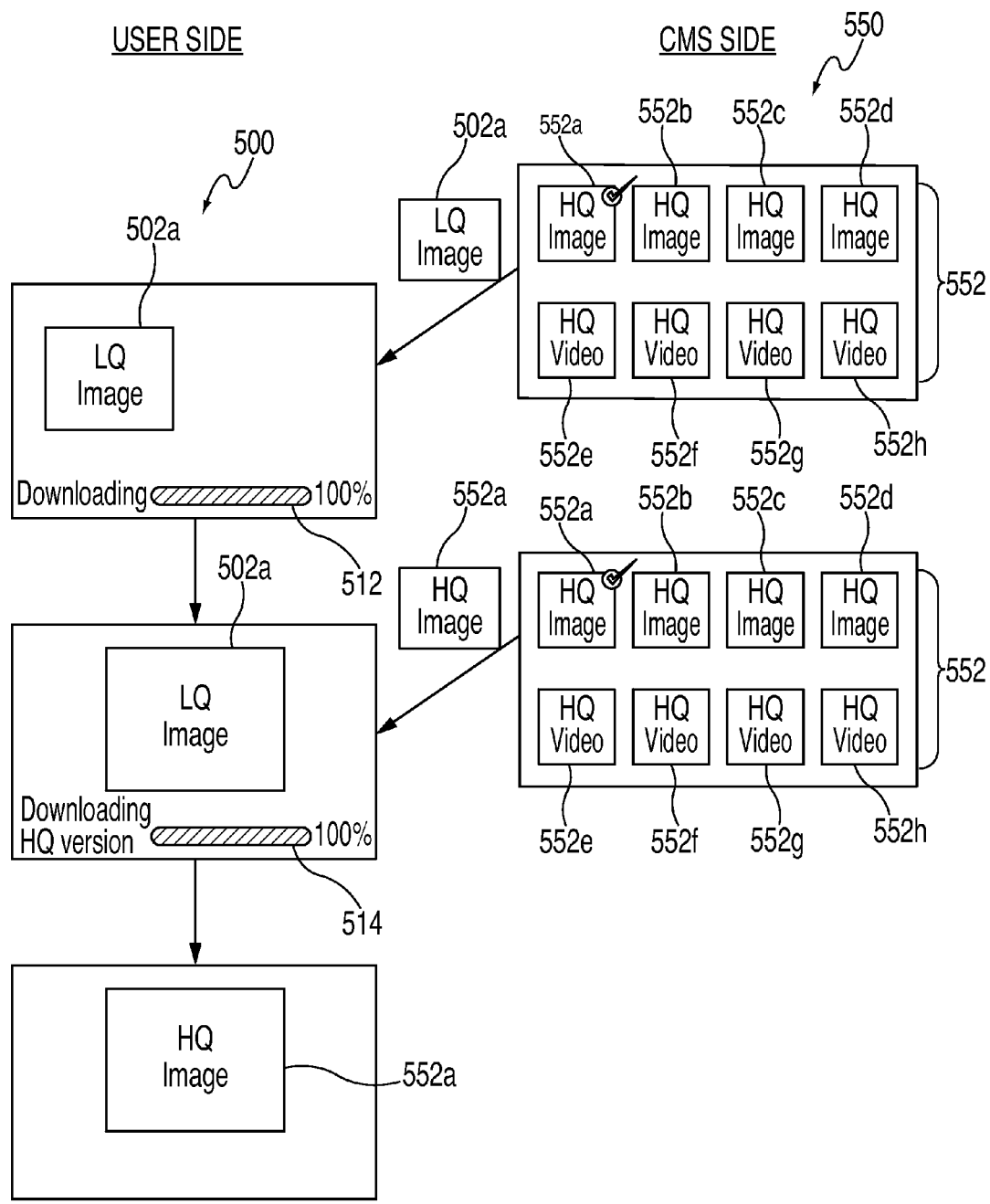
FIG. 5 shows a schematic illustration of a user interface displaying a download of a first version of an image from a content management system and a download of a second version of the image from the content management system while displaying the first version of the image within the user interface in accordance with various embodiments.

FIG. 5 shows a schematic illustration of a user interface displaying a download of a first version of a content item from a content management system and a download of a second version of the content item from the content management system while displaying the first version of the content item within the user interface in accordance with various embodiments. In some embodiments, a content management system may include user interface 550. User interface 550 may display content items 552, which may include one or more images and/or videos stored within a user account on the content management system. For example, user interface 550 may display images 552*a-d* and videos 552*e-h*. Although only four images and four videos are displayed within user interface 550, persons of ordinary skill in the art will understand that any number of images, videos, or other content items may be displayed within user interface 550.

In some embodiments, the images and/or videos may have been initially stored, uploaded, or shared in a first version. For example, images 552*a-d* may be high quality images, such as HD (1080p) images, although any image type may be stored within the user account on the content management system. In some embodiments, multiple versions of the images and/or videos may be stored on the content management system. For example, a user may upload a low resolution version of the image first and then a higher resolution version of the image at a latter point in time. In some embodiments, if a high resolution version of an image is first stored on the content management system, the content management system may create a lower resolution image of the high resolution image for faster transmission. For example, the lower resolution version of the image may be smaller in size, thus sending the image may be faster and/or more efficient for instance if the level of connectivity between the device and content management system is weak. Thus, a greater level of confidence may be provided to the user that the image will be downloaded.

In some embodiments, a user may access the content management system via user interface 500. After access has been granted, the user may select one or more content items to be downloaded from the user account on the content management system to a user device that displays user interface 500. For example, the user may select higher-quality image 552*a* stored within the user account on the content management system to be downloaded to the user device. In some embodiments, in response to selection of higher-quality image 552*a*, a lower-quality version of the image may be created and may be used initially for downloading to the user device. For example, if the level of connectivity between the user device and the content management system is low (e.g., less than a predefined threshold of connectivity), then lower-quality image 502a may be used initially for download to the user device. Lower-quality image 502a may be substantially similar to higher-quality image 552a with the exception that lower-quality image 502a may be smaller in size, compressed, have a lower pixel value, and/or a lower aspect ratio than higher-quality image 552a. Lower-quality image 502a may, in some embodiments, download faster than higher-quality image 552a would due to the level of connectivity between the user device and the content management system. Thus, the user may be capable of viewing a version of the image in a substantially short amount of time regardless of the level of connectivity.

In some embodiments, user interface 500 may include download bar 512 to indicate the download status of lower-quality image 502a. Download bar 512 may display various download characteristics of image 502a to the user. For example, download bar 512 may display a percentage of the image that has been downloaded, remaining time for the image to download, and/or any other downloading statistics.

After lower-quality image 502a has downloaded to the user device, it may be displayed within user interface 500. In some embodiments, image 502a may be displayed in a substantially full-screen mode. In some embodiments, the user may be able to interact with the lower-quality image 502a while a higher-quality version of the image, (e.g., higher-quality image 552a) downloads in the background. For example, a set of interactivity features may be available to the user to interact with lower-quality image 502a while higher-quality image 552a downloads in the background. The set of interactivity features may include, but are not limited to such features as sharing, modifying, copying to a folder or collection, adding to a shared virtual space, and/or providing a message. These features may be available to the user for the lower-quality version of the image while the higher quality version of the image downloads in the background. Thus, allowing the user may be able to interact with the image locally in a short amount of time while still obtaining the highest quality version of the image available.

Downloading image 552a in the background while providing the set of interactivity features with image 502a may allow the user to have a local feel for the image even though the highest resolution image may not be currently available on the user device. For example, if the level of connectivity between the user device and the content management system is low, lower-quality image 502a may download to the device faster than higher-quality image 552a. In response to lower-quality image 502a downloading, the user may interact with the lower-quality version while higher-quality image 552a downloads in the background. In some embodiments, download bar 514 may be displayed within user interface 500 to indicate to the user the download status of the higher-quality image while the user interacts with the lower-quality image.

In response to the download of higher-quality image 552a finishing, higher-quality image 552a may be displayed within user interface 500 in place of lower-quality image 502a. In some embodiments, after higher-quality image 552a has completely downloaded, lower-quality image 502a may be deleted from the user device to conserve storage space. For example, lower-quality image 502a may be 1 MB in size, whereas higher-quality image 552a may be 8 MB in size. After higher-quality image 552a has downloaded, the 1 MB of storage space previously occupied by lower-quality image 502a may be recovered by deleting the low quality image from the user device. In some embodiments, lower-quality image 502a may be retained on the user device so it may be used for other uses. For example, a thumbnail version of image 502a may be kept on the user device to be viewed in a gallery view.

In some embodiments, after higher-quality image 552a has downloaded to the user device, the higher-quality image may be displayed within user interface 500 and may include any interactions and/or modifications previously associated with lower-quality image 502a. For example, if the user adds a message to lower-quality image 502a while higher-quality image 552a downloaded in the background, those interactions may be transferred to higher-quality image 552a upon its download. Thus, any information associated with the lower-quality image may now be associated with the higher-quality image. This may provide the user with a seamless user experience by allowing the user to fully interact with an image, no matter the level of connectivity between the user device and the content management system. Furthermore, even if the highest resolution version of an image is not capable of being interacted with currently on the user device, the user may still be afforded the local feel of interacting with a first version of the image while having the higher resolution version of the image download to their device.

Figure 6:
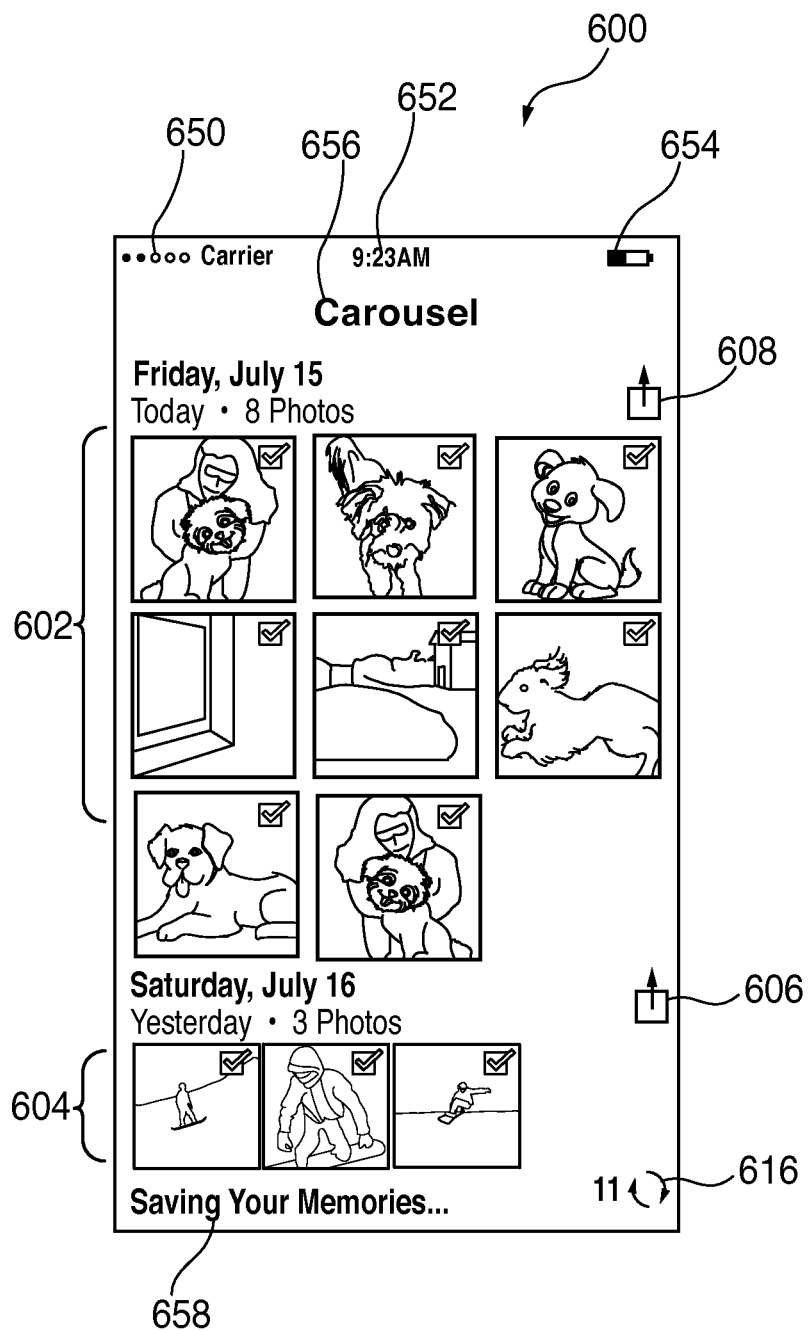
FIG. 6 shows another schematic illustration of a user interface displaying paused uploading of images selected to be uploaded to a content management system in accordance with various embodiments.
Figure 7C:
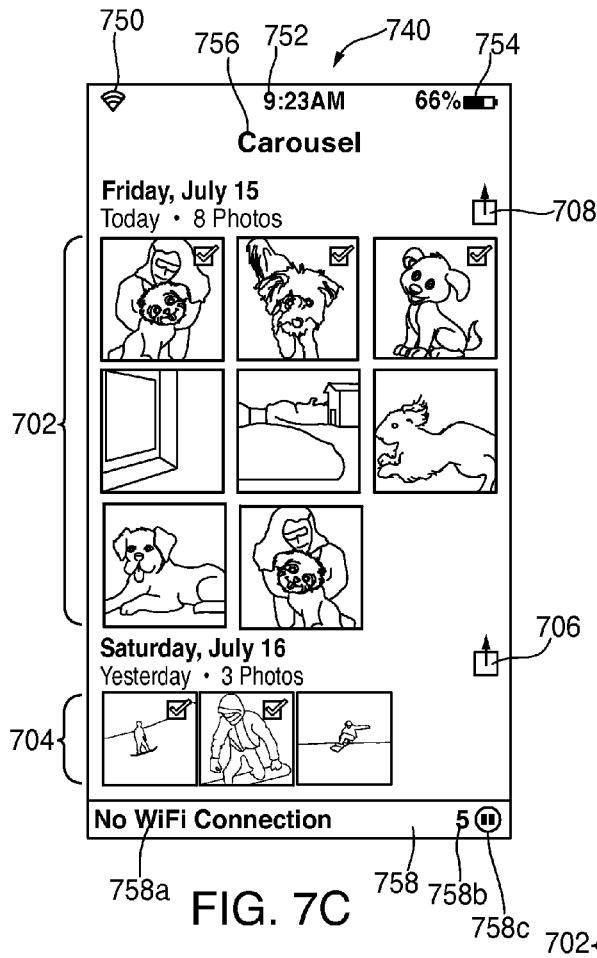
Figure 7D:
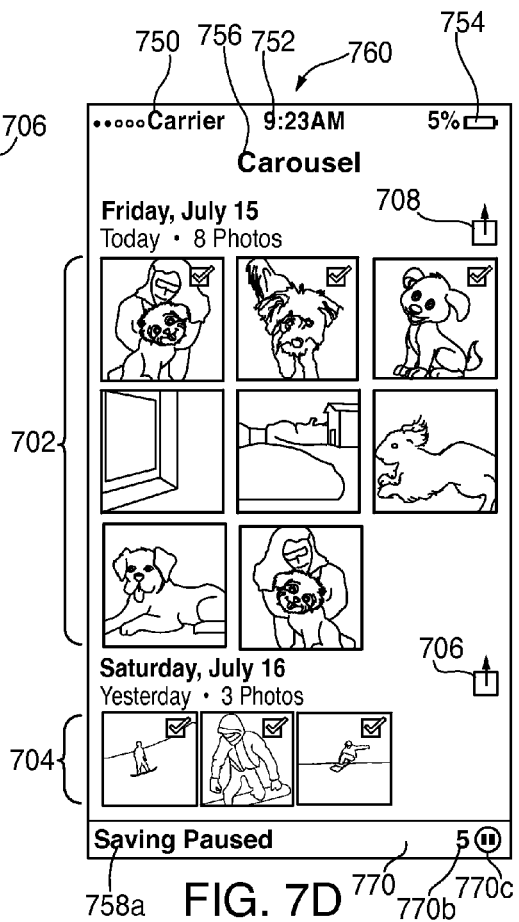
Figure 7E:
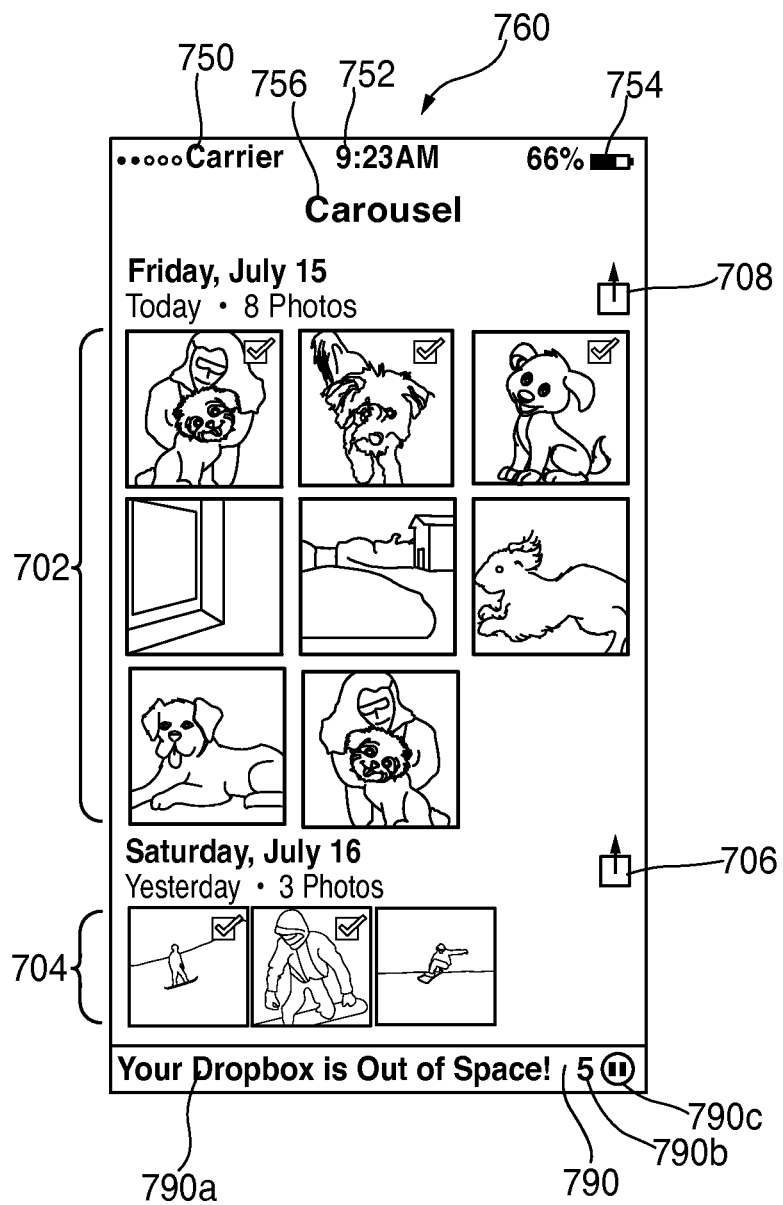

FIG. 6 shows another schematic illustration of a user interface displaying paused uploading of content items selected to be uploaded to a content management system in accordance with various embodiments. User interface 600 may include collections 602 and 604. In some embodiments, collections 602 and 604 may be substantially similar to collections 302 and 304 of FIG. 3, and the previous description of the latter may apply to the former. In some embodiments, collections 602 and 604 may be selected to be uploaded to a content management, such as content management system 100 of FIG. 1. The uploading may attempt to take place, however due to one or more factors, the uploading may not be able to be completed or may be delayed.

User interface 600 may also include share buttons 606 and 608, which may be substantially similar to share buttons 206 and 208 of FIG. 2, and the previous description of the latter may apply to the former. In some embodiments, user interface 600 may include service carrier and strength indicator 650, time indicator 652, battery charge indicator 654, and/or application title 656, which may, in some embodiments, be substantially similar to service carrier and strength indicator 250, time indicator 252, battery charge indicator 254, and/or application title 256 of FIG. 2, and the previous description of the latter may apply to the former.

In some embodiments, in response to determining that the uploading may not be completed, or the uploading may be stalled, the progress of the uploading may be saved on the user's device and/or to the content management system. For example, a user attempting to upload collection 602 and/or 604 may lose connectivity unexpectedly while the uploading is in progress. Instead of having to redo the upload from scratch, the progress of the upload may be saved to the user device in temporary memory, saved in cache memory, and/or saved to the content management system. For example, the user may attempt to upload collection 602 to their user account on the content management system. However, during the upload the connectivity between the user device and the content management system may unexpectedly be lost. In this scenario, the progress may be saved in cache memory on the user device so that if or when connectivity is restored, only the remaining portion of the upload may resume. As another example, the content management system may store partial files corresponding to the portion of the collection successfully uploaded. If the connectivity is lost prior to the entire collection being uploaded, the content management system may store the partial files so that when connectivity returns, the content management system may indicate to the user device the amount previously uploaded and the remaining portions may upload.

In some embodiments, upload indicator 616 may be displayed within user interface 600 to indicate to the user the status of the upload. For example, if uploading is occurring, a moving circle, a spiraling bar, or any other indicator may be displayed indicating to the user that uploading is taking place. As another example, if uploading is attempting to occur but is not progressing, an indicator may be displayed indicating to the user that the uploading has paused. In some embodiments, as upload indicator 616 displays on the user interface, a corresponding message, such as message 658, may be displayed on the user interface. For example, message 658 may read "Saving Your Memories," indicating that the user may currently be attempting to upload the selected images to the content management system. Message 658 may read any message corresponding to a current user action or mode, and the aforementioned illustration is merely exemplary. In some embodiments, message 658 may not be present or may be located within any portion of user interface 600.

In some embodiments, the user may be able to interact with any image included within collections 602 and/or 604 while the uploading occurs, regardless of whether or not uploading is in progress, completed, or paused. For example, collections 602 and 604 may be selected to be uploaded to the content management system; however, network connectivity may spontaneously be lost during the uploading. In this scenario, the user may still be able to interact with any image included within collections 602 and/or 604 as if the uploading had already completed. This may provide the user with a local feel as if their interactions with the images are seamless regardless of the level of connectivity between the device and the content management system. For example, the user may be able to attempt to share an image with one or more contacts, or add a message to an image while the uploading attempts to occur.

FIGS. 7A-E show various schematic illustrations of user interfaces displaying paused uploads of images to a content management system based on various connectivity factors in accordance with various embodiments. User interfaces 700, 720, 740, 760, and 780 may each include collections 702 and 704 and share buttons 706 and 708, which may be substantially similar to collections 202 and 204 and share buttons 206 and 208 of FIG. 2, and the previous description of the latter may apply to the former. Each of user interfaces 700, 720, 740, 760, and 780 may display collections 702 and 704, which may have been selected to be uploaded to a content management system. However due to one or more factors, the uploading may not be completed and/or may be paused. In some embodiments, the uploading may remain paused until the one or more factors preventing the uploading from completing have been resolved. Furthermore, each of user interfaces may include service carrier and strength indicator 750, time indicator 752, battery charge indicator 754, and/or application title 756, which may, in some embodiments, be substantially similar to service carrier and strength indicator 250, time indicator 252, battery charge indicator 254, and/or application title 256 of FIG. 2, and the previous description of the latter may apply to the former.

User interface 700 may correspond to a scenario where the uploading of collections 702 and 704 may be paused. In some embodiments, message bar 710 may be displayed within user interface 700 indicating to the user that uploading has paused. For example, message bar 710 may include icon 710c corresponding to pausing of the upload and/or icon 710b indicating a number of content items (e.g., photos), that have been paused for upload. Message bar 710 may also indicate that the upload progress has been saved via message 710a. For example, message 710a may read "Saving paused" indicating that the uploading of the selected content items has been paused.

User interface 720 may correspond to a scenario where the uploading of collections 702 and 704 may be delayed or paused due to a lack of network connectivity between the user device and the content management system. For example, user interface 720 may include message bar 730, which includes message 730a indicating to the user that no internet connection has been detected. Message bar 730 may also include icons 730b and 730c, which may be substantially similar to icons 710b and 710c, and the previous description of the latter may apply to the former. The uploading of collections of images 702 and 704 may remain paused, and message bar 730 may remain displayed within user interface 720 until internet connection has been detected and/or restored. In some embodiments, in order for the uploading to resume, a specific level of connectivity may be required. For example, if only one service bar out of five available service bars is present, the uploading of collections 702 and 704 may remain paused until the level of connectivity has exceeded the required threshold (e.g., three bars). Persons of ordinary skill in the art will understand that any level of connectivity may be available and any threshold may be used, and the use of one service bar out of five available service bars is merely exemplary.

User interface 740 may correspond to a scenario where uploading of collections 702 and 704 may delayed or paused due to a lack of Wi-Fi connection. For example, user interface 740 may include message bar 750, which may include message 758a, which may indicate to the user that no Wi-Fi connection may be currently available. Message bar 750 may also include icons 758b and 758c, which may be substantially similar to icons 710b and 710c, and the previous description of the latter may apply to the former. In some embodiments, the user device may only include Wi-Fi capabilities (e.g., a device lacking cellular communication circuitry), thus without a detectable Wi-Fi connection, uploading content to a content management system may not be possible. In some embodiments, the uploading of collections 702 and 704 may remain paused until the Wi-Fi connection returns and/or exceeds a predefined threshold.

User interface 760 may correspond to a scenario where the uploading of collections 702 and 704 may be delayed or paused due to a low battery level on the user device. For example, user interface 760 may include message bar 770, which may indicate to the user that their device displaying user interface 760 may have a low battery. For example, message bar 770 may include message 770a, indicating that the uploading has been paused, which may be due to the low battery charge on the device. Message bar 770 may also include icons 770b and 770c, which may be substantially similar to icons 710b and 710c, and the previous description of the latter may apply to the former. In some embodiments, the device's battery level may be ascertained from the device's operating system diagnostics. For example, the device and/or the content management system may perform a random, periodic, or continuous polling of the device's diagnostics in order to determine various performance features of the device, including the battery life. In some embodiments, the uploading of collections 702 and 704 may remain paused until the battery life reaches a predefined threshold required for uploading and/or the device is plugged into a charging unit. This may help prevent the user device from unexpectedly shutting off due to a lack of battery charge being available, or may help prevent the user from draining their battery even further to complete the uploading. This may be particularly useful to ensure that the device retains some charge for emergency situations where the user may need to use the remaining charge of the device to perform an emergency phone call (e.g., to dial 911 or other emergency care providers).

User interface 780 may correspond to a scenario where the uploading of collections 702 and 704 may be delayed or paused because the user account on the content management system may be full (e.g. the user has reached or exceeded their storage quota), and/or may not have enough storage space to fully upload all of the content selected to be uploaded. For example, user interface 780 may include message bar 790, which includes message 790a Message 790a may, in some embodiments, indicate to the user that their account on the content management system is out of space. In some embodiments, the user may be prompted by the content management system to obtain additional storage space and/or remove one or more content items from their account to retrieve additional space. Message bar 790 may also include icons 790b and 790c, which may be substantially similar to icons 710b and 710c, and the previous description of the latter may apply to the former.

Figure 8:
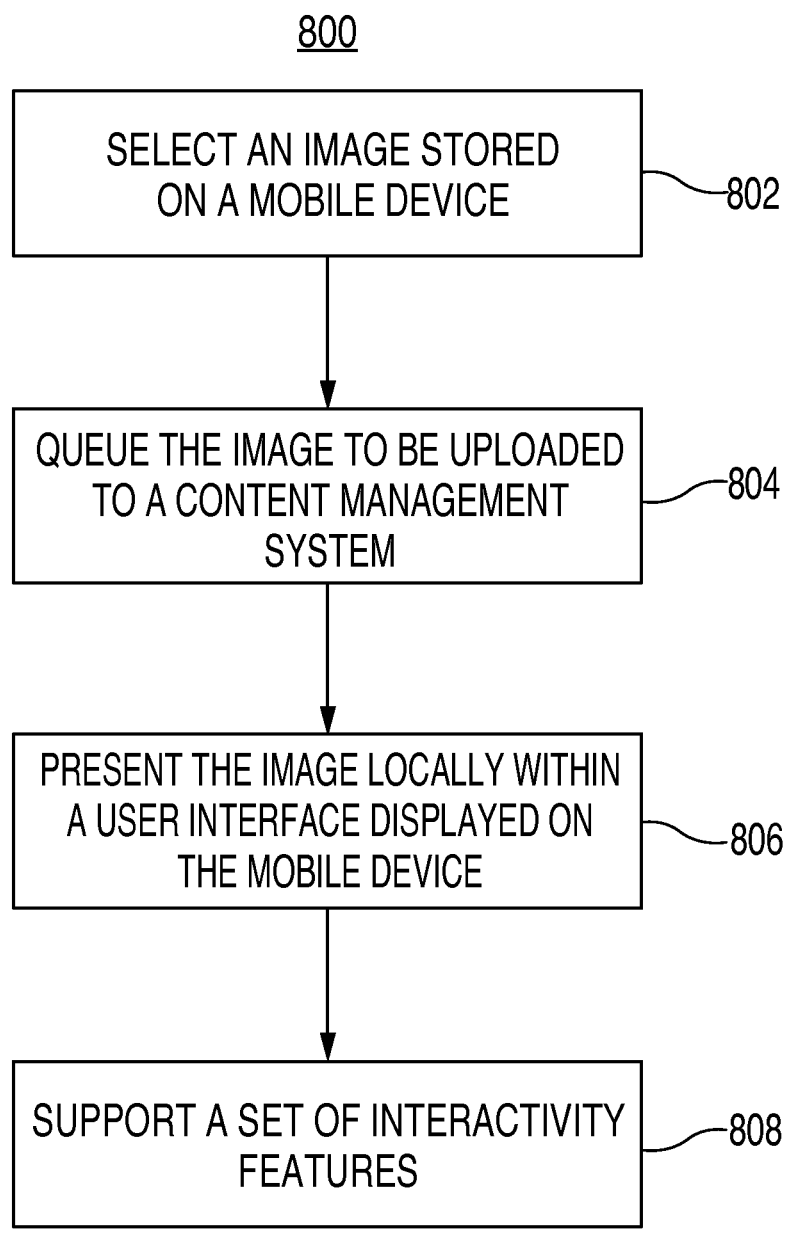
FIG. 8 shows an illustrative flowchart of a process for supporting full interactivity on a user device in accordance with various embodiments.

FIG. 8 shows an illustrative flowchart of a process for supporting a set of interactivity features on a user device in accordance with various embodiments. Process 800 may begin at step 802. At step 802, a content item, such as an image, stored on a user device may be selected. In some embodiments, the selected image may correspond to an image captured using one or more image capturing components resident on the user device (e.g., camera 138). Various types of images may include, but are not limited to, high-definition ("HD") photographs, HD videos, standard definition photographs, standard definition videos, short clip videos, slideshows, or any other type of image, or any combination thereof. Although step 802 corresponds to a user selecting one image, persons of ordinary skill in the art will understand that any number of content items or images may be selected, and the use of one image is merely exemplary. For example, a user may select one or more images, one or more videos, and/or a combination of one or more images and videos.

In some embodiments, the user may select the content item using one or more gestures. For example, the user may perform one or more gestures corresponding to one or more physical motions, movements, hoverings, inferences, signs, or any other such physical interactions with one or more sensors, or any combination thereof, including vocal commands or interpretations of eye movements based on retinal tracking. In some embodiments, the selected content item may be stored within storage/memory on the user device. The content item may also be received via an attachment to an SMS message, an MMS message, and/or an email message. In still further embodiments, the content item may be received via one or more social media networks and/or shared with the user via a content management system (e.g., content management system 100).

At step 804, the content item may be queued for upload to a content management system. In some embodiments, the upload may occur in response to one or more triggers. For example, in response to detecting that the network connectivity between the user device and the content management system exceeds a predefined threshold, image 402a may upload to the content management system. The user may also be capable of selecting, pressing, and/or invoking an upload button on a user interface to queue the upload. For example, the user may invoke upload button 406 of FIG. 4 to upload image 402a to the content management system. In some embodiments, the user may have a user account on the content management system, and the upload may attempt to place the selected content item within the user account. In some embodiments, selecting and queuing the upload of the content item may occur at a substantially same time and/or in one step.

At step 806, the content item may be presented to the user locally within a user interface displayed on the user device. For example, the user interface may display an image in a full screen mode or in a substantially full screen mode. In some embodiments, presenting the content item may include categorizing the content item with any or all content items currently stored within the user account on the content management system and/or known to the user device. For example, one or more categorization algorithms resident on either the user device and/or the content management system may categorize a selected image with one or more additional images stored in the user account that have been previously presented, categorized, shared, and/or interacted with by the user. The categorization algorithm(s) may place the content item with one or more of the content items stored within the user account on the content management system based on one or more factors associated with the content item. For example, geographical data, temporal data, sharing data, recent viewing data, and/or content data (e.g., facial recognition) associated with an image may be used by the categorization algorithm(s) to group the image with one or more images already stored in the user account.

In some embodiments, the categorization algorithms may present the content item to the user along with any other content items that may have been selected for upload to the content management system. The other content items need not be fully uploaded to the content management system in order to be categorized with the content item. For example, collections 302 of FIG. 3 may include multiple images. Image 302a may be categorized with image 302b based on a variety of categorization factors, regardless of whether or not image 302b has been uploaded to the content management system. In some embodiments, both image 302a and 302b may be categorized together and may be selected and queued for upload at the same time.

At step 808, the user device may provide a set of interactivity features for interacting with the content item presented within the user interface prior to the content item being uploaded to the content management system. In some embodiments, supporting the set of interactivity features may include presenting the content item to the user within the user interface as if the uploading to the content management system had already completed. An image may be in the process of being uploaded, or the uploading may be paused, and the user may be able to interact with the content item as if the uploaded had already completed. In some embodiments, the set of interactivity features may include, but are not limited to: providing a share of a content item, annotating a content item, providing/adding a message to a content item, modifying a content item, adding a content item to one or more collections of content items, and/or moving the image from a first collection to a second collection. For example, the user may add message 408 to image 402*a* and the message may be displayed within the user interface as if the message and the image had already uploaded to the content management system.

In some embodiments, one or more of steps 802-808 may occur at substantially the same time. For example, queuing the content item for upload, presenting the content item within the user interface, and providing the set of interactivity features may occur at substantially the same time. This may enable the user to interact with the content item regardless of whether or not the content item has completely uploaded to the content management system.

In some embodiments, one or more metadata files associated with the content item may be uploaded to the content management system prior to the uploading. For example, an image may include a metadata portion, such as a header file, that may be substantially smaller in size than the image file itself. The smaller metadata file may upload faster than the image file due to its size. With the metadata file uploaded prior to the image file, the metadata may be used to categorize the image within one or more collections on the content management system. In some embodiments, the categorization data may be sent back to the user device to categorize the image within the one or more collections prior to uploading the image.

In some embodiments, a level of connectivity between the user device and the content management system may be determined. The level of connectivity may correspond to the strength of internet connection and/or the strength of a Wi-Fi signal available to the user device. The level of connectivity may also include, but is not limited to, available battery life of the user device, service provider constraints (e.g., a cellular data plan), and/or the amount of occupied storage space within a user account on the content management system, or any other connectivity measure, or any combination thereof. In some embodiments, the level of connectivity may be determined prior to step 802 and/or may repeatedly be performed to analyze a current status of the connectivity. For example, a diagnostic check may be performed on the device and/or received from the device's operating system manually, at periodic time intervals, and/or continually. Persons of ordinary skill in the art will understand that the determination may be made at any point during process 800.

In some embodiments, in response to determining that the level of connectivity exceeds a defined threshold, the content item may be uploaded, or begin to upload, from the user device to the content management system. In some embodiments, however, in response to determining that the level of connectivity does not exceed the defined threshold, the uploading of the content item from the user device to the content management system may pause. The upload may attempt to restart and/or continue in response to a determination that the level of connectivity surpasses the defined threshold. The defined threshold may be any level of network connectivity, Wi-Fi strength, battery charge, available storage space, and/or data plan restriction. For example, if the user device only has 10% battery remaining, and the defined threshold is 20%, the uploading may pause until the battery charge exceeds the 20% threshold. This, however, is merely exemplary, and any charge level or other threshold may be implemented.

Figure 9:
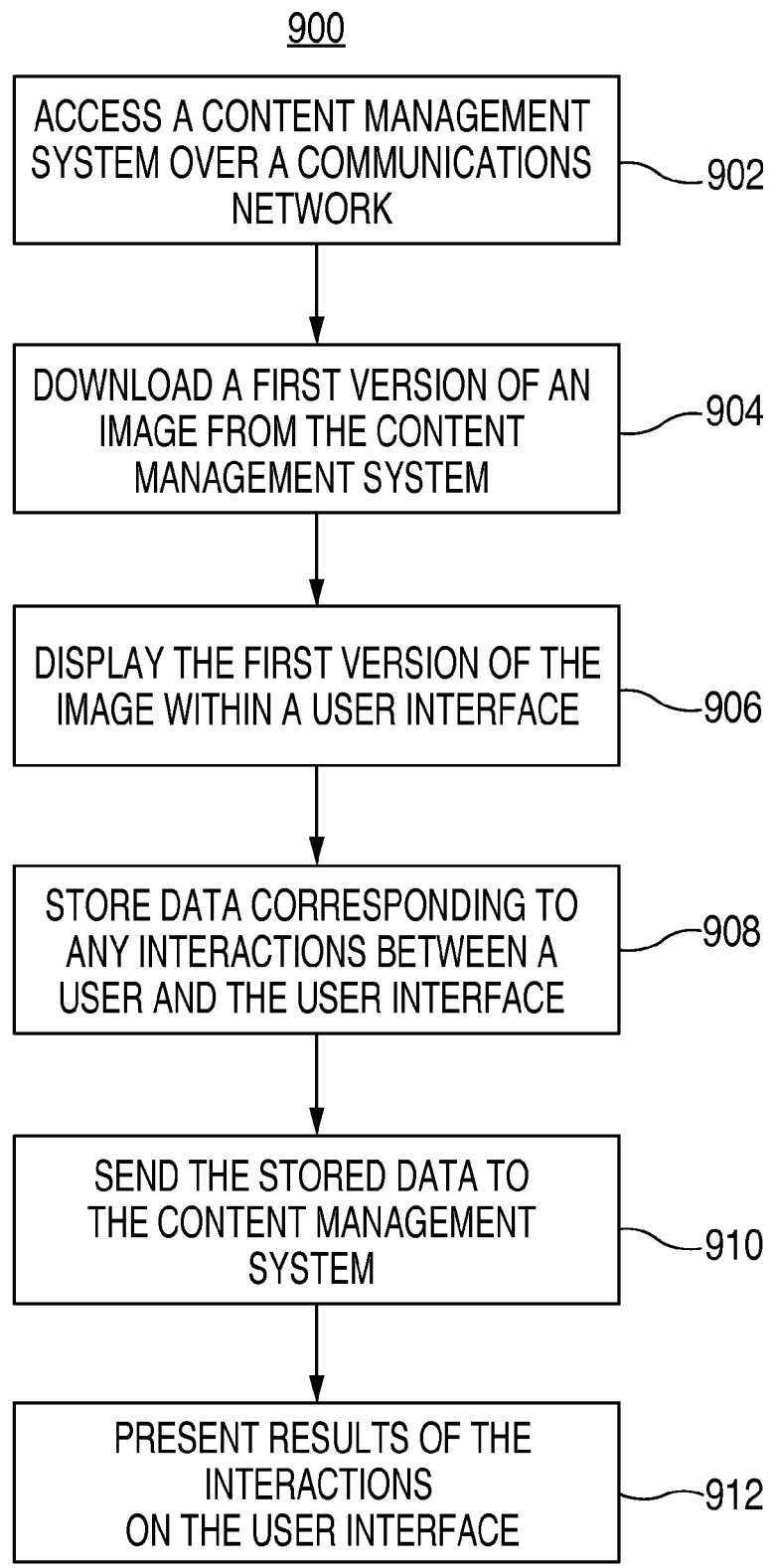
FIG. 9 shows an illustrative flowchart of a process for sending data corresponding to user interactions to a content management system while presenting results of the interactions on a user interface in accordance with various embodiments.

FIG. 9 shows an illustrative flowchart of a process for sending data corresponding to user interactions to a content management system while presenting results of the interactions within a user interface in accordance with various embodiments. Process 900 may begin at step 902. At step 902, a user may attempt to access a content management system over a communications network using a user device. For example, user devices 102 of FIG. 1 may attempt to access content management system 100 across network 106. In some embodiments, the user may be required to log-in to a user account on the content management system corresponding to the user. In some embodiments, the user device may be capable of storing the user's log-in credentials so the user may not be required to continually be granted access to the content management system. In some embodiments, the content management system may recognize that the user device upon the attempt to gain access, and store credentials associated with the device to allow it to access the content management system. For example, the user device may have an associated IP address and/or serial number, which may be unique, and the content management system may store these numbers in a database. Upon the device attempting to access the content management system, a determination may be made that the device's IP address and/or serial number matches the stored IP address and/or serial number, and access may be granted.

At step 904, a first version of an image may be downloaded from the content management system to the user device. After access has been granted to the content management system, a user may attempt to download an image, such as image 552*a* of FIG. 5 to the user device. For example, the user may make a download request for an image stored on the content management system. In response to the download request/attempt, a first version of the image, such as lower-quality image 502*a* may be downloaded to the device. In some embodiments, the first version of the image may be of a low resolution to help facilitate the download. For example, if the internet connection and/or Wi-Fi signal is weak, a lower resolution image may download faster than a higher resolution image due to the fact that the lower resolution file may typically be smaller in size than the higher resolution version. Thus, because the lower resolution file may be smaller, it may fully download to the device faster than the larger, high resolution image.

At step 906, the first version of the image may be displayed within the user interface. In some embodiments, the user interface may correspond to a dedicated application associated with the content management system. For example, content management application 114 of FIG. 1 may display the user interface within a display screen of the user device. In some embodiments, the first version of the image may be displayed within the display screen of the user device in a substantially full-screen mode. For example, after image 502*a* has downloaded to the user device, it may be displayed within user interface 500 in a substantially full screen mode.

At step 908, data corresponding to any interactions between the user and the user interface may be stored within storage on the device. Various types of interactions may include, but are not limited to, sharing the image, annotating the image, providing a message for the image, modifying the image, adding the image to a collection of images, and/or moving the image from a first collection to a second collection, or any other suitable interaction, or any combination thereof. In some embodiments, the user may interact with the user interface, and thus with the first version of the image displayed thereon, using any suitable means. For example, the display screen may be a touch-sensing display interface capable of detecting various gestures and providing inputs to the device based on the detected gestures. Persons of ordinary skill in the art will recognize that any type of touch-sensing display interface may be used as the display screen, and the use of a display screen capable of detecting gestures and providing inputs is merely exemplary.

At step 910, the stored data may attempt to be sent to the content management system. In some embodiments, the stored data may be attempted to be sent across a network using communications circuitry resident on the user device. In some embodiments, the data corresponding to the detected user interactions may be synced with one or more additional user devices that the user may use to access the content management system upon transmission of the data. For example, data corresponding to the interactions may be synced with various user devices, such as user device 102*a* and user device 102*b*, via content management system 100. An interaction on one device may be sent to the content management system and then synced to another device with which the user has previously synchronized with their user account on the content management system.

In some embodiments, the stored data may attempt to be sent in data packets as they are detected and stored. In some embodiments, a copy of the stored data may attempt to be sent to the content management system, and the original information may be retained locally by the user device. In some embodiments, the stored data may be used by the content management system once sent to aid in categorizing one or more images and/or other content items. For example, the stored data may include information corresponding to the user's share history with the image. The share history may attempt to be sent to the content management system to be used to categorize the image with one or more additional images or content items that have previously been shared in a similar manner (e.g., a same contact, social media network, etc.).

At step 912, results of the interactions between the user and the user interface may be presented within the user interface as if the data had already been sent. For example, a user may add a message to the first version of the image, and the message may be presented within the user interface along with the image regardless of whether or not it has successfully uploaded to the content management system. In some embodiments, the results may include information corresponding to categorizing the first version of the image with one or more additional images stored on the user device and/or within the user's account on the content management system. For example, if the user shares the image with one or more contacts, the sharing information may be used to group the image with other images that have been shared with the same one or more contacts. In this scenario, categorization data may be stored locally on the user device to allow the categorization to be performed prior to the data being sent to the content management system. As another example, the content management system may send categorization data to the user device periodically to be used to categorize images. In some embodiments, the attempt to send the stored data and presentation of the results may occur at a substantially same time. However, persons of ordinary skill in the art will understand that one or more of steps 902-912 may occur together and/or in a different order, without deviating from the spirit and scope of the process.

In some embodiments, a background download of a second version of the image from the content management system may be performed while the first version of the image is displayed within the user interface. For example, while presenting image 502*a* of FIG. 5 within user interface 500, image 552*a* may download in the background. The user may be able to interact with the user interface, and therefore the first version of the image, even while the background download of the second version of the image occurs. This may allow the user to interact with an image as soon as possible, even though the highest quality image, and/or the originally requested image, may not be downloaded at that point in time. In some embodiments, the first version of the image may correspond to a low resolution image and the second version of the image may correspond to a high resolution image. For example, image 502*a* may correspond to a lower-quality image and/or a standard definition image, while image 552*a* may correspond to a higher-quality image and/or an HD image.

In some embodiments, the background download of the second version of the image may be performed based on a dynamic priority list. The dynamic priority list may correspond to a list of one or more images that may be ordered based on one or more factors. Various types of factors may form the basis of the dynamic priority listing including, but not limited to, network connectivity, available storage space, the amount of content/images to be downloaded, the available battery charge of the user device, recent viewing history, currently viewed/displayed images, or any other factor, or any combination thereof. The dynamic priority list may factor in the network connection strength between the user device and the content management system and, based on the connection strength, select the one or more images to be background downloaded to the user device. For example, if the level of connectivity between the user device and the content management system is low or weak, then it may be determined that higher-quality image 552*a* may not download within a reasonable amount of time. In this scenario, lower-quality image 502*a* may have downloaded recently, and because of this, higher-quality image 552*a* may be selected from a list of higher-quality images to be downloaded at a lower transmission rate or at a later point in time when there is a stronger connection. This may provide a significant benefit to the user because they may be able to access and interact with content as soon as possible while still obtaining the highest quality image available, regardless of the network connection. As another example, if the user device has only a limited amount of storage space, the device may not be capable of storing higher-quality image 552*a*. In this scenario, a thumbnail resolution version of the image may have download first and, in response to additional storage space being procured, a higher resolution version of the image may be selected to download. Thus, the user, even with limited storage space, may still be able to access and interact with a version of the image while still obtaining a highest quality image available.

In some embodiments, the downloaded second version of the image may replace the first version of the image within one or more collections that include the first version of the image. For example, in response to downloading higher-quality image 552*a*, lower-quality image 502*a* may no longer be needed for redundancy, and therefore may be replaced or deleted from the user device. In some embodiments, the first version of the image may remain within temporary memory or cache memory on the user device until the second version of the image has downloaded, or for a period of time after the second version has downloaded. In some embodiments, the one or more collections that the second version of the image now may reside may be created in response to the stored data. For example, the user may share lower-quality image 502*a* with one or more contacts. Image 502*a* may then be placed in a collection with one or more images that have also been shared with the same one or more contacts. In response to downloading the higher-quality image 552*a*, lower-quality image 502*a* may be replaced within the collection by higher-quality image 552*a* including some or all of the information or interaction data associated previously with lower-quality image 502*a*. In some embodiments, the lower-quality images may remain stored on the user device even after the higher-quality version downloads.

Figure 10:
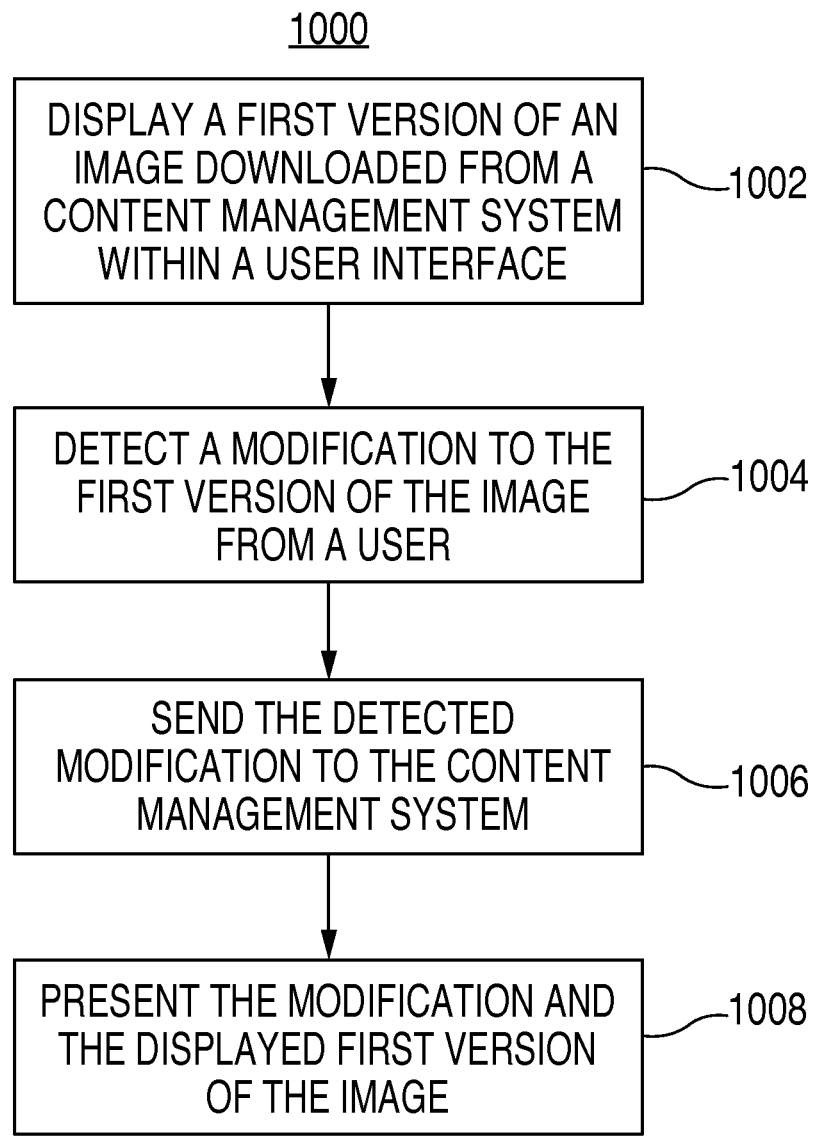
FIG. 10 shows an illustrative flowchart of a process for presenting modifications to a displayed first version of an image along with the first version of the image to a user in accordance with various embodiments.

FIG. 10 shows an illustrative flowchart of a process for presenting modifications to a displayed first version of an image along with the first version of the image in accordance with various embodiments. Process 1000 may begin at step 1002. At step 1002, a first version of an image downloaded from a content management system may be displayed within a user interface. In some embodiments, the user interface may be displayed on a display screen resident on a user device. For example, user interface 400 of FIG. 4 may be displayed on a touch-sensing display interface located on user device 102 of FIG. 1. In some embodiments, the first version of the image may correspond to a lower-quality image. The lower-quality image may be downloaded from the content management system in response to a user's request to download the lower-quality image, or in response to a request to download a higher-quality image. For example, depending on a level of connectivity between the user device and the content management system, a lower-quality image may be downloaded because the lower-quality image may be substantially smaller in size than the higher-quality image. This may make the likelihood of download substantially higher and/or the time required to download may be quicker than if the higher-quality image was downloaded instead due to the size of higher-quality image.

At step 1004, a modification to the first version of the image from the user may be detected. In some embodiments, the image may be displayed on a touch-sensing display interface, and any interactions (e.g., modifications) to the image may be capable of being detected by the touch-sensing display interface. Various types of modifications may include, but are not limited to, a request to share the image, annotations, messages provided to the images, requests or selections to add the image to a collection, a change to a currently viewed image or an image viewing history, and/or moving the image from a first collection to a second collection, or any other modification, or any combination thereof. For example, a user may want to add a message to the first version of the image, and may select a message button displayed within the user interface, tap of the image itself, or provide any other suitable input to enable a message to be provided.

At step 1006, the detected modification may attempt to be sent to the content management system. For example, the user may add message 408 to image 402*a*. In response to adding message 408, the message may attempt to be sent to the content management system via transmission line 430. In some embodiments, the message may be stored on the content management system along with image 402*a* after the transmission has completed. The message and the corresponding image may include one or more similar identification tags or bit-strings associating the message and the image with one another.

In some embodiments, the transmission of the detected modification may be based on the level of connectivity between the user device and the content management system. For example, if the level of connectivity is weak or low, message 408 may attempt to be sent at a lower transmission rate, paused until the level of connectivity reaches or exceeds a defined threshold, and/or attempted to be sent in blocks or data packets. In some embodiments, the detected modification may attempt to be sent in the background while the user continues to interact with the image. For example, the user may add message 408 to image 402*a*, and while the message attempts to send to the content management system, the user may request to share the image including the message. In this scenario, the attempted transmission of the message need not be complete prior to the user requesting the share, and the share may also attempt to be sent to the content management system after or in parallel with message 408.

At step 1008, the modification may be presented with the displayed first version of the image within the user interface. In some embodiments, the detected modification may appear within the user interface with the image regardless of whether or not transmission of the modification to the content management system has been completed. For example, message 408 may appear within user interface 400 before it has been completely sent to the content management system. This may provide the user with a seamless local feel for the user interface, as they may be able to experience a set of interactivity features regardless of the transmission's status. In some embodiments, step 1006 and 1008 may occur at a substantially same time. In some embodiments, step 1008 may occur prior to step 1006. However, persons of ordinary skill in the art will understand that any step or portion of process 1000 may occur at any point in time or along with any other step, and the ordering of process 1000 is merely exemplary.

In some embodiments, a second version of the image may attempt to be downloaded in the background while the attempted transmission of the detected modification occurs. For example, while message 408 attempts to be sent across transmission line 430, a second version of image 402*a* (e.g., a higher quality version) may attempt to be downloaded in the background. In some embodiments, the second version of the image may replace the first version of the image, and any modifications detected for the first version may be transferred and/or copied to the second version of the image. In some embodiments, the first and/or the second version of the image may be categorized within one or more collections based on the detected modification. For example, the user may link a contact to the first version of the image. As the linking attempts to be sent to the content management system, the image lined to the contact may be used by the user device to associate the image with one or more additional images also including the same contact.

Figure 11:
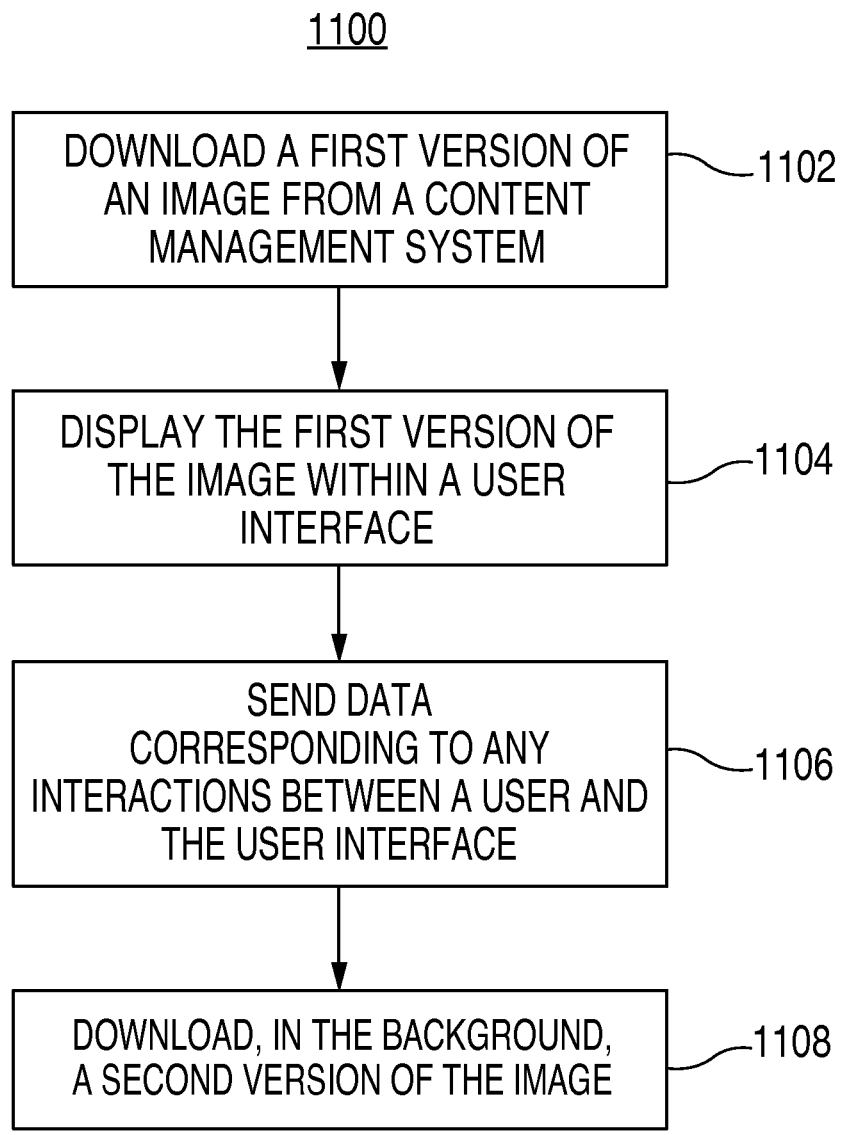
FIG. 11 shows an illustrative flowchart of a process for performing a background download of a second version of an image from a content management system while displaying a first version of the image downloaded from the content management system in accordance with various embodiments.

FIG. 11 shows an illustrative flowchart of a process for performing a background download of a second version of an image from a content management system while displaying a first version of the image in accordance with various embodiments. Process 1100 may begin at step 1102. At step 1102, a first version of an image may be downloaded from a content management system. At step 1104, the first version of the image may be displayed within a user interface on a user device. In some embodiments, steps 1102 and 1104 of FIG. 11 may be substantially similar to steps 904 and 906 of FIG. 9, and the previous descriptions of the latter may apply to the former.

At step 1106, data corresponding to any interactions between the user and the user interface may attempt to be sent to the content management system. For example, the interaction data may be stored at the time of occurrence, however for one or more reasons transmission may not be possible, and the transmission of the interaction may then be queued. In some embodiments, a level of connectivity between the user device and the content management system may be determined, and based on the determined level, the transmission may be attempted. For example, if the level of connectivity is weak or low, the transmission may attempt to occur at a substantially lower transmission rate than if the level of connectivity was strong or high. As another example, if the level of connectivity is low or weak, the transmission pause until the level exceeds a predefined threshold for transmission.

At step 1108, a second version of the image may be downloaded in the background from the content management system while the transmission attempts to occur. For example, a user may provide message 408 to image 402a of FIG. 4. As message 408 attempts to send to the content management system over transmission line 430, a second version of image 402a (e.g., a higher quality version) may attempt to download in the background. Thus, a user may be able to interact locally with the first version of the image while the second version attempts to download in the background. This may be beneficial to the user, for example, when the level of connectivity may initially be weak, but increases at a latter point in time. Thus, the user may be able to download a lower quality image first at the low connectivity level, and then as the connectivity gets better, the higher quality image may download in the background while the user interacts with the lower quality image.

Figure 12:
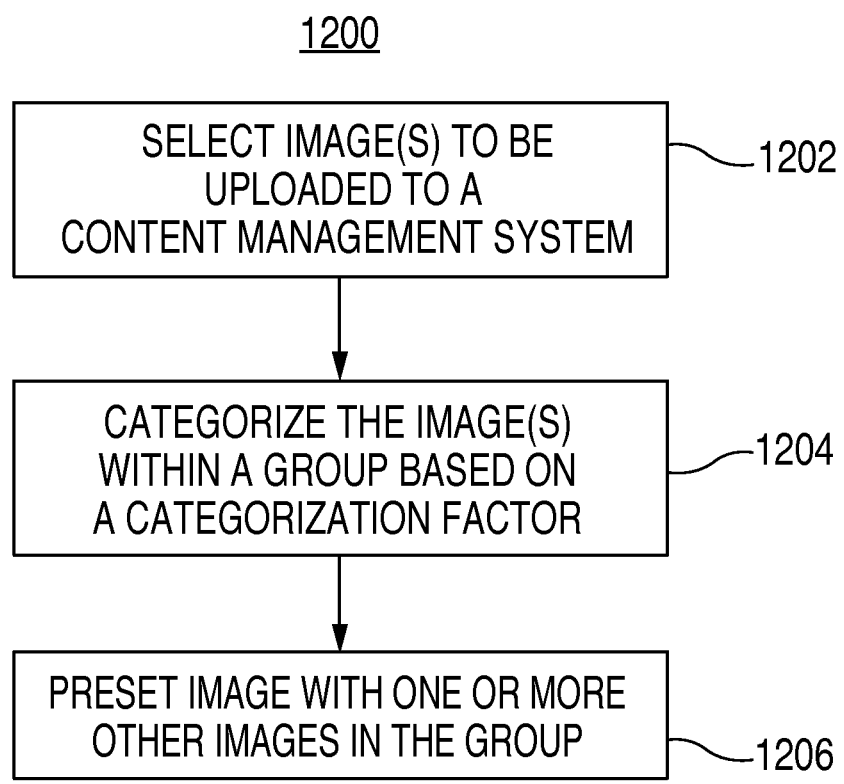
FIG. 12 shows an illustrative flowchart of a process for presenting one or more images in categorized collections locally within a user interface in accordance with various embodiments.

FIG. 12 shows an illustrative flowchart of a process for presenting one or more content items in collections of content items locally within a user interface in accordance with various embodiments. Process 1200 may begin at step 1202. At step 1202, one or more content items, such as images, may be selected from a plurality of content items. The one or more content items may be selected to be uploaded from a user device to a content management system. In some embodiments, the user may have an account on the content management system, and the uploading of the one or more content items may place the one or more selected content items within the user's account. The one or more selected content items may be selected by the user using any suitable selection technique. In some embodiments, the user may perform one or more gestures to select a content item. For example, the user may tap on selection marker 302a of FIG. 3 to select that image.

At step 1204, the one or more selected content items may be categorized within a collection based on one or more categorization factors. In some embodiments, the collection may include one or more additional content items already stored on the content management system that also have one or more similar categorization factors. For example, one or more images may correspond to a specific event, and the categorization may group the images with any additional images from the event already stored on the content management system. In some embodiments, the categorization may group the one or more content items in one or more collections. For example, in addition to collecting the one or more images with additional images from the event, the categorization may group the one or more images with one or more additional images stored on the content management system including a similar contact or contacts determined to be within the one or more images. Various types of categorization factors may include, but are not limited to, geographical factors, temporal factors, content determined to be within the one or more content items, and/or shares of the one or more content items. In some embodiments, the categorization data may be sent, or may attempt to be sent, to the user device prior to the one or more content items being stored on the content management system. This may allow the user device to display the one or more content items within their appropriate collections prior to an upload occurring.

At step 1206, the categorized one or more content items and the one or more additional content items may be presented locally within a user interface displayed on a user device. For example, collections 202 and 204 may be displayed within user interface 200 on the user device. In some embodiments, the displayed user interface may be presented to the user at a substantially same time as the categorization. For example, the one or more content items may be categorized within the collection and may be displayed to the user in parallel.

In some embodiments, the selected one or more content items may attempt to be uploaded to the content management system while being presented within the user interface with the one or more additional content items. For example, the uploading may occur in the background and the user may be able to visualize and/or interact with the one or more presented images while the uploading attempts to takes place.

FIG. 12 shows an exemplary system in accordance with various embodiments. In some embodiments, system 1200 of FIG. 12 may be substantially similar to system 100 of FIG. 1, with the exception that the former may present elements of system 100 at a more granular level (e.g., modules, applications, etc.).

In some embodiments, user devices 102 may be used to create, access, modify, and manage content items, such as content items 110a and 110b (collectively 110), stored locally within content item system 108a and 108b (collectively systems 108) on user device 102 and/or stored remotely on content management system 104 (e.g., within data store 118). For example, user device 102a may access content items 110b stored remotely with data store 118 of content management system 104 and may, or may not, store content item 110b locally within content item system 108a on user device 102a. Continuing with the example, user device 102a may temporarily store content item 110b within a cache locally on user device 102a, make revisions to content item 110b, and the revisions to content item 110b may be communicated and stored in data store 118 of content management system 104. Optionally, a local copy of content item 110a may be stored on user device 102a. In some embodiments, data store 118 may include one or more collections 132 of content items. For example, collections 132 may include one or more content items having similar properties (e.g., metadata) and/or including similar content.

In some embodiments, user devices 102 may include camera 138 (e.g., 138a and 138b) to capture and record digital images and/or videos. User devices 102 may capture, record, and/or store content items, such as images, using camera 138. For example, camera 138 may capture and record images and store metadata with the images. Metadata may include, but is not limited to, the following: creation time timestamp, geolocation, orientation, rotation, title, and/or any other attributes or data relevant to the captured image. Metadata values may be stored as attribute 112 name-value pairs, tag-value pairs, and/or any other method, or any combination thereof, to associate the metadata with the content item and easily identify the type of metadata. In some embodiments, attributes 112 may be tag-value pairs defined by a particular standard, including, but not limited to, Exchangeable Image File Format ("Exif"), JPEG File Interchange Format (Jfif), and/or any other standard.

In some embodiments, user devices 102 may include time normalization module 146, and content management system 104 may include time normalization module 148. Time normalization module 146 (e.g., 146a and 146b) may be used to normalize dates and times stored with a content item.

Time normalization module 146, counterpart time normalization module 148, and/or any combination thereof, may be used to normalize dates and times stored for content items. The normalized times and dates may be used to sort, group, perform comparisons, perform basic math, and/or cluster content items.

In some embodiments, user devices 102 may include organization module 136, and content management system 104 may include organization module 140. Organization module 136 (e.g., 136a and 136b) may be used to organize content items into clusters or collections of content items, organize content items to provide samplings of content items for display within user interfaces, and/or retrieve organized content items for presentation. Organization module 136 may utilize any clustering algorithm. Organization module 136 may be used to identify similar content items for clusters in order to organize content items for presentation within user interfaces on user devices 102 and content management system 104. Similarity rules may be defined to create one or more numeric representations embodying information on similarities between each of the content items in accordance with various similarity rules. Organization module 136 may use numeric representations as a reference for similarity between content items in order to cluster the content items.

In some embodiments, content items may be organized into clusters to aid with retrieval of similar content items in response to search requests. For example, organization module 136a may identify that two images are similar and may group the images together in a cluster. Organization module 136a may process content items to determine clusters independently and/or in conjunction with counterpart organization module (e.g., 140 and/or 136b). In other embodiments, organization module 136a may only provide clusters identified with counterpart organization modules (e.g., 140 and/or 136b) for presentation. Continuing with this example, processing of content items to determine clusters may be an iterative process that may be executed upon receipt of new content items and/or new similarity rules.

In some embodiments, user device 102a may include classification module 150a, while user device 102b may include classification module 150b (collectively 150), which may be used independently, in combination with classification module 152 include on content management system 104, and/or any combination thereof to classify content items, rectify content items, and/or classify images. For example, the classification modules 150 and/or 152 may be used to determine if an image includes a document, and if there so, determine a type of document stored therein. Content item rectification may be performed to correct, perform further transformations, and/or crop content items to improve the display of the content items (e.g., correct the display of a document within an image).

In some embodiments, user device 102a may include search module 142a, while user device 102b may include search module 142b, which collectively may be referred to as search modules 142. Content management system 104 may also be provided with counterpart search module 144. Each of search modules 142 and 144 may be capable of supporting searches for content items located on both user devices 102 and/or content management system 104. A search request may be received by search module 142 and/or 144 that requests one or more content items. In some embodiments, the search may be handled by searching metadata and/or attributes assigned to content items during the provision of management services. For example, cluster markers stored with content items may be used to find content items by date. In this particular scenario, cluster markers may indicate an approximate time, or average time, for the content items stored with the cluster marker, and the marker may be used to speed the search and/or return the search results with the contents of the cluster with particular cluster markers.

Content items 110 managed by content management system 104 may be stored locally within content item system 108 of respective user devices 102 and/or stored remotely within data store 118 of content management system 104 (e.g., content items 134 in data store 118). Content management system 104 may provide synchronization of content items managed thereon. Attributes 112a and 112b (collectively 112) or other metadata may also be stored with content items 110. For example, a particular attribute may be stored with a content item to track content items locally stored on user devices 102 that are managed and/or synchronized by content management system 104. In some embodiments, attributes 112 may be implemented using extended attributes, resource forks, or any other implementation that allows for storing metadata with a content item that is not interpreted by a content item system, such as content item system 108. In particular, attributes 112a and 112b may be content identifiers for content items. For example, the content identifier may be a unique or nearly unique identifier (e.g., number or string) that identifies the content item. By storing a content identifier with the content item, the content item may be tracked. For example, if a user moves the content item to another location within content item system 108 hierarchy and/or modifies the content item, then the content item may still be identified within content item system 108 of user device 102. Any changes or modifications to the content item identified with the content identifier may be uploaded or provided for synchronization and/or version control services provided by content management system 104.

A stand-alone content management application 114a and 114b (collectively 114), client application, and/or third-party application may be implemented on user devices 102a and 102b, respectively, to provide a user interface to a user for interacting with content management system 104. Content management application 114 may expose the functionality provided with content management interface module 154 and accessible modules for user device 102. Web browser 116a and 116b (collectively 116) may be used to display a web page front end for a client application that may provide content management 104 functionality exposed/provided with content management interface module 154.

Content management system 104 may allow a user with an authenticated account to store content, as well as perform management tasks, such as retrieve, modify, browse, synchronize, and/or share content with other accounts. Various embodiments of content management system 104 may have elements including, but not limited to, content management interface module 154, account management module 120, synchronization module 122, collections module 124, sharing module 126, file system abstraction 128, data store 118, and organization module 140. Content management interface module 154 may expose the server-side or back end functionality/capabilities of content management system 104. For example, a counter-part user interface (e.g., stand-alone application, client application, etc.) on user devices 102 may be implemented using content management interface module 154 to allow a user to perform functions offered by modules of content management system 104.

The user interface displayed on user device 102 may be used to create an account for a user and/or authenticate the user to use the account using account management module 120. Account management module 120 may provide the functionality for authenticating use of an account by a user and/or user device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., content item edit history), maximum storage space authorized, storage space used, content storage locations, security settings, personal configuration settings, content sharing data, etc. An amount of storage space on content management system 104 may be reserved, allotted, allocated, stored, and/or may be accessed with an authenticated account. The account may be used to access content items 134 and/or content items 110 within data store 118 for the account, and/or content items 134 and/or content items 110 made accessible to the account that are shared from another account. In some embodiments, account management module 120 may interact with any number of other modules of content management system 104.

An account on content management system 104 may, in some embodiments, be used to store content such as documents, text items, audio items, video items, etc., from one or more user devices 102 authorized by the account. The content may also include collections of various types of content with different behaviors, or other mechanisms of grouping content items together. For example, an account may include a public collection that may be accessible to any user. In some embodiments, the public collection may be assigned a web-accessible address. A link to the web-accessible address may be used to access the contents of the public folder. In another example, an account may include a photos collection that may store photos and/or videos, and may provide specific attributes and actions tailored for photos and/or videos. The account may also include an audio collection that provides the ability to play back audio items and perform other audio related actions. The account may still further include a special purpose collection. An account may also include shared collections or group collections that may be linked with and available to multiple user accounts. In some embodiments, access to a shared collection may differ for different users that may be capable of accessing the shared collection.

Content items 110 and/or content items 134 may be stored in data store 118. Data store 118 may, in some embodiments, be a storage device, multiple storage devices, or a server. Alternatively, data store 118 may be cloud storage provider or network storage accessible via one or more communications networks. Content management system 104 may hide the complexity and details from user devices 102 by using content item system abstraction 128 (e.g., a content item system database abstraction layer) so that user devices 102 do not need to know exactly where the content items are being stored by content management system 104. Embodiments may store the content items in the same collections hierarchy as they appear on user device 102. Alternatively, content management system 104 may store the content items in various orders, arrangements, and/or hierarchies. Content management system 140 may store the content items in a network accessible storage (SAN) device, in a redundant array of inexpensive disks (RAID), etc. Content management system 104 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a content item system, or any other collection of data. In some embodiments, each content item stored in data store 118 may be assigned a system-wide unique identifier.

Data store 118 may, in some embodiments, decrease the amount of storage space required by identifying duplicate content items or duplicate chunks of content items. Instead of storing multiple copies, data store 118 may store a single copy of content item 134 and then use a pointer or other mechanism to link the duplicates to the single copy. Similarly, data store 118 may store content items 134 more efficiently, as well as provide the ability to undo operations, by using a content item version control that tracks changes to content items, different versions of content items (including diverging version trees), and a change history. The change history may include a set of changes that, when applied to the original content item version, produce the changed content item version.

Content management system 104 may be configured to support automatic synchronization of content from one or more user devices 102. The synchronization may be platform independent. That is, the content may be synchronized across multiple user devices 102 of varying type, capabilities, operating systems, etc. For example, user device 102a may include client software, which synchronizes, via synchronization module 122 at content management system 104, content in content item system 108 of user devices 102 with the content in an associated user account. In some cases, the client software may synchronize any changes to content in a designated collection and its sub-collection, such as new, deleted, modified, copied, or moved content items or folders. In one example of client software that integrates with an existing content management application, a user may manipulate content directly in a local folder, while a background process monitors the local content item for changes and synchronizes those changes to content management system 104. In some embodiments, a background process may identify content that has been updated at content management system 104 and synchronize those changes to the local collection. The client software may provide notifications of synchronization operations, and may provide indications of content statuses directly within the content management application. In some embodiments, user device 102 may not have a network connection available. In this scenario, the client software may monitor the linked collection for content item changes and queue those changes for later synchronization to content management system 104 when a network connection is available. Similarly, a user may manually stop or pause synchronization with content management system 104.

A user may also view or manipulate content via a web interface generated and served by content management interface module 154. For example, the user may navigate in a web browser to a web address provided by content management system 104. Changes or updates to content in data store 118 made through the web interface, such as uploading a new version of a content item, may be propagated back to other user devices 102 associated with the user's account. For example, multiple user devices 102, each with their own client software, may be associated with a single account, and content items in the account may be synchronized between each of user devices 102.

Content management system 104 may include sharing module 126 for managing sharing content and/or collections of content publicly or privately. Sharing module 126 may manage sharing independently or in conjunction with counterpart sharing module 152*a*, located on user device 102*a*, and sharing module 152*b* located on user device 102*b* (collectively sharing modules 152). Sharing content publicly may include making the content item and/or the collection accessible from any device in network communication with content management system 104. Sharing content privately may include linking a content item and/or a collection in data store 118 with two or more user accounts so that each user account has access to the content item. The sharing may be performed in a platform independent manner. That is, the content may be shared across multiple user devices 102 of varying type, capabilities, operating systems, etc. For example, one or more share links may be provided to a user, or a contact of a user, to access a shared content item. The content may also be shared across varying types of user accounts. In particular, the sharing module 126 may be used with collections module 124 to allow sharing of a virtual collection with another user or user account. A virtual collection may be a collection of content identifiers that may be stored in various locations within content item systems 108 of user device 102 and/or stored remotely at content management system 104.

In some embodiments, the virtual collection for an account with a content management system may correspond to a collection of one or more identifiers for content items (e.g., identifying content items in storage). The virtual collection is created with collections module 124 by selecting from existing content items stored and/or managed by content management system and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item to a directory) the content item in another location within data storage in order to place the content item in the collection.

In some embodiments, content management system 104 may be configured to maintain a content directory or a database table/entity for content items where each entry or row identifies the location of each content item in data store 118. In some embodiments, a unique or a nearly unique content identifier may be stored for each content item stored in data store 118.

In some embodiments, metadata may be stored for each content item. For example, metadata may include a content path that may be used to identify the content item. The content path may include the name of the content item and a content item hierarchy associated with the content item (e.g., the path for storage locally within a user device 102). Content management system 104 may use the content path to present the content items in the appropriate content item hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator ("URL"), which allows any web browser to access the content in content management system 104 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be sent to content management system 104 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be sent to content management system 104 which may use the received content identification data to identify the appropriate content entry or database row and return the content item associated with the content entry or database row.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or "false" to indicate that a URL to the content item has not been created. Sharing module 126 may be configured to change the value of the flag to 1 or "true" after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This may allow a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Exemplary Systems

In exemplary embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for providing a user interface to a user capable of a set of interactivity features in a variety of operational modes, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed:

1. A method, comprising:
    queuing a content item for upload from a user device to a content management system;
    presenting, prior to upload, the content item within a gallery of content items within a user interface displayed on the user device, wherein the gallery of content items comprises one or more previously uploaded content items and one or more content items queued for upload;
    categorizing, within the gallery of content items and regardless of upload status, the content item in a collection of content items comprising at least one content item previously uploaded to an account on the content management system;
    providing a set of interactivity features on the user device for interacting, regardless of upload status, with the one or more previously uploaded content items and the one or more content items queued for upload;
    uploading metadata associated with the content item to the content management system prior to uploading the content item; and
    receiving, from the content management system and prior to completing an upload of the content item to the content management system, categorization data for the content item from the content management system based on the uploaded metadata.

2. The method of claim 1, further comprising identifying the content item from a plurality of content items stored on the user device.

3. The method of claim 1, further comprising:
    presenting the content item within the user interface categorized in the collection of content items while the content item uploads to the content management system.

4. The method of claim 1, further comprising
    categorizing, prior to completing the upload of the content item to the content management system, the content item in the collection of content items based on the categorization data received from the content management system.

5. The method of claim 1, wherein the content item comprises one or more of an image, a video, a text item, a music item, or a collection of images.

6. The method of claim 1, wherein the collection of content items comprises:
    a content item previously uploaded to the account on the content management system; and
    a content item queued for upload from the user device but that has not completely uploaded.

7. The method of claim 1, further comprising:
    categorizing the content item with at least one additional content item queued to be uploaded from the user device to the content management system; and
    displaying the collection of content items comprising the content item and the at least one additional content item within the user interface.

8. The method of claim 1, wherein the content item comprises one or more of: a content item stored on the user device, a content item attached to a received email, a content item attached to a received SMS message, a content item attached to a received MMS message, or a content item received via a social media network.

9. The method of claim 1, wherein the set of interactivity features comprises one or more of: a sharing option, an annotating option, a messaging option, an option for adding the content item to a collection, or an option for moving the content item from a first collection of content items to a second collection of content items.

10. The method of claim 1, further comprising:
determining a level of connectivity between the user device and the content management system; and
pausing the upload of the content item in response to the level of connectivity being below a defined threshold.

11. The method of claim 1, wherein queuing, presenting, and providing occur at a substantially same time.

12. The method of claim 1, wherein presenting the content item within the gallery of content items comprises presenting a collective grid of thumbnail images representing the content item, the one or more previously uploaded content items, and the one or more content items queued for upload.

13. The method of claim 12, further comprising organizing, within the gallery of content items, the grid of thumbnail images to represent a plurality of separate collections of content items.

14. The method of claim 13, wherein each of the separate collections of content items is associated with one or more unique categorization factors.

15. The method of claim 13, wherein each of the separate collections of content items is associated with its own interactivity feature.

16. The method of claim 1, wherein providing a set of interactivity features comprises:
providing an option for a user to select a subset of content items from the gallery of content items; and
providing an interactivity feature to be applied jointly to the subset of content items regardless of the individual upload status of each content item in the subset of content items.

17. The method of claim 16, further comprising applying the interactivity feature to the subset of content items regardless of connectivity with the content management system.

18. A user device comprising:
a display screen;
communications circuitry;
a non-transitory storage medium storing instructions thereon; and
at least one processor, wherein the instructions, when executed by the at least one processor, cause the user device to:
access a user account on a content management system over a communications network using the communications circuitry, the user device being authorized by the user account;
download a first version of an image from the account on the content management system, the first version of the image comprising a low resolution version of the image;
display the first version of the image within a user interface on the display screen;
detect one or more user interactions with the displayed first version of the image;
store data corresponding to the one or more user interactions with the displayed first version of the image within the storage;
send the stored data to the content management system over the communications network using the communications circuitry;
display the first version of the image in a way that reflects the one or more user interactions;
download a second version of the image from the account on the content management system while the first version of the image is displayed within the user interface, the second version of the image comprising a high resolution version of the image; and
display the second version of the image in a way that reflects the one or more user interactions.

19. The user device of claim 18, wherein the instructions, when executed by the at least one processor, further cause the user device to:
display the first version of the image in a way that reflects the one or more user interactions prior to sending the stored data to the content management system.

20. The user device of claim 18, wherein the instructions, when executed by the at least one processor, further cause the user device to:
send the stored data and display the first version of the image in a way that reflects the one or more user interactions at a substantially same time.

21. The user device of claim 18, wherein the instructions, when executed by the at least one processor further cause the user device to:
download the second version of the image based on a dynamic priority list.

22. The user device of claim 18, wherein the first version of the image comprises a thumbnail resolution version of the image.

23. The user device of claim 18, wherein the one or more user interactions comprise one or more of: sharing, annotating, messaging, modifying, adding to a collection, or moving from a first collection of content items to a second collection of content items.

24. The user device of claim 18, wherein, the instructions, when executed by the at least one processor, further cause the user device to download the second version of the image in the background while sending the stored data corresponding to the one or more user interactions to the content management system.

25. The user device of claim 18, wherein, the instructions, when executed by the at least one processor, further cause the user device to, upon downloading the second version of the image, replace the first version of the image with the second version of the image within the user interface.

26. A non-transitory computer readable medium containing instructions that, when executed by at least one processor of a user device, cause the user device to:
display a first version of an image downloaded from a content management system within a user interface presented on a display screen of the user device;
detect a modification to the first version of the image, the first version of the image comprising a low resolution version of the image;
queue data corresponding to the modification for upload to the content management system;
present the modification to the first version of the image and the first version of the image within the user interface at a substantially same time regardless of connectivity with the content management system;
download a second version of the image from the content management system in the background while the first version of the image is displayed within the user interface, the second version of the image comprising a high resolution version of the image; and
transfer the modification of the first version of the image to the second version of the image.

27. The non-transitory computer readable medium of claim 26, wherein the instructions, when executed by the at least one processor of the user device, further cause the user device to:

present any detected additional modifications to the first version of the image with the first version of the image; and send data corresponding to the additional modifications to the content management system while presenting the detected additional modifications to the first version of the image.

\* \* \* \* \*